Dec. 5, 1939.  J. B. ARMITAGE  2,182,421
MILLING MACHINE
Filed June 20, 1936     10 Sheets-Sheet 2
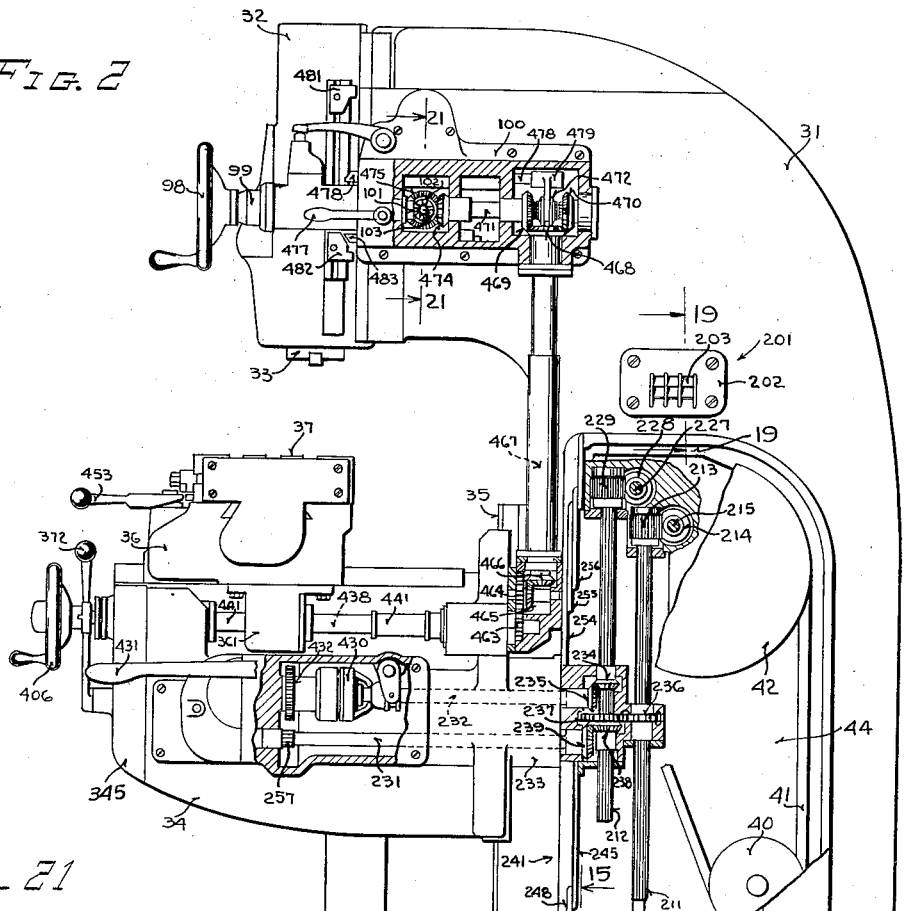
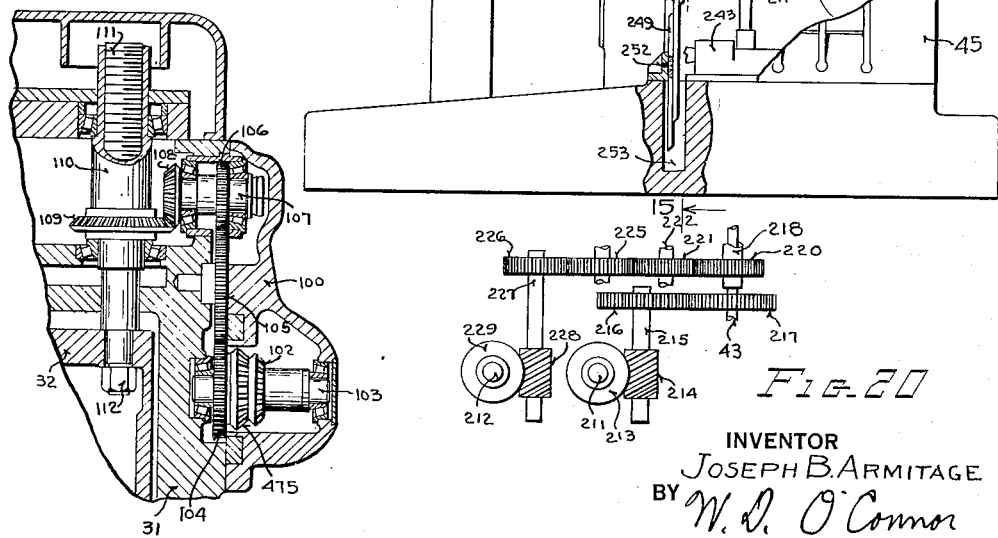
INVENTOR
JOSEPH B. ARMITAGE
BY W. D. O'Connor
ATTORNEY

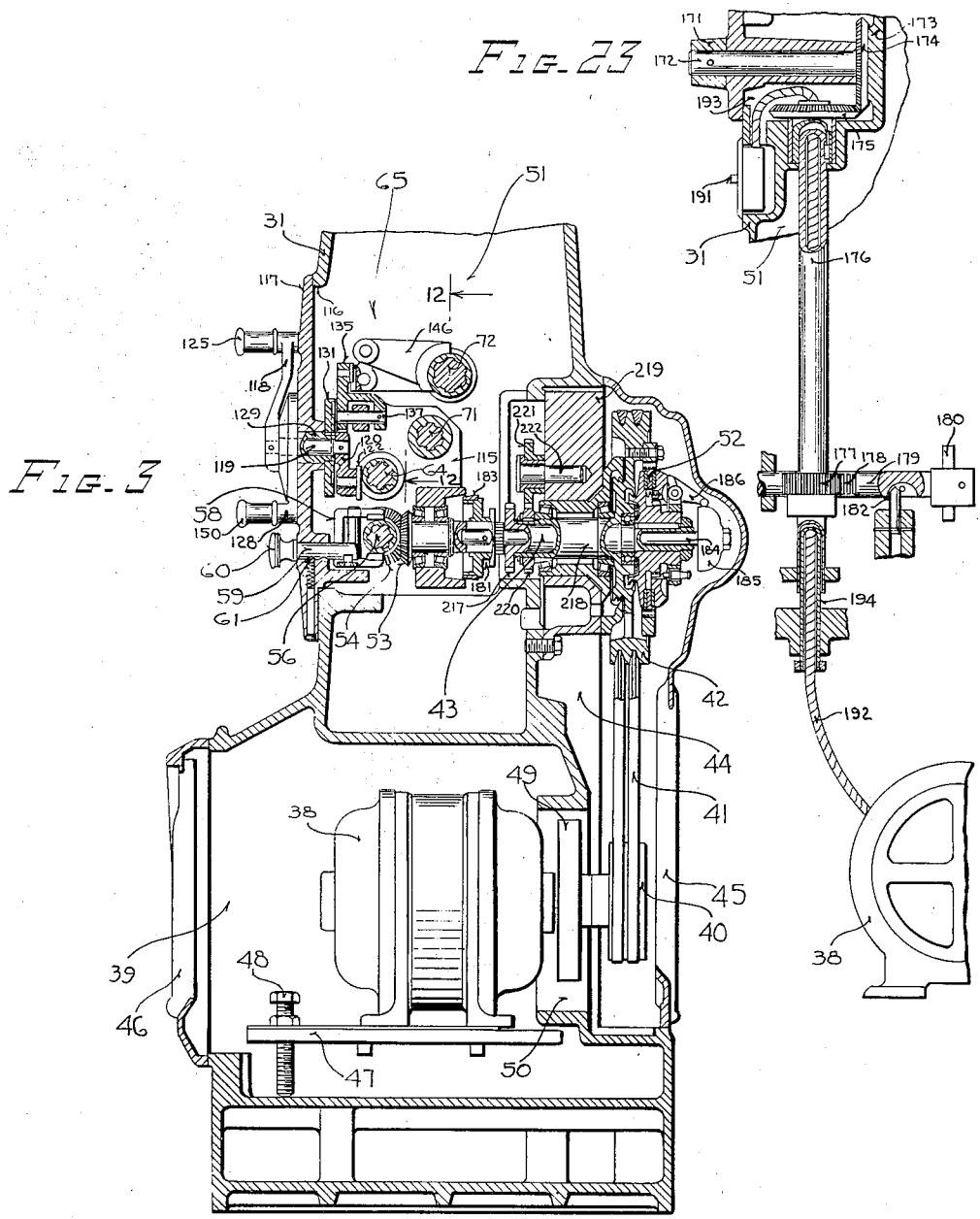

Dec. 5, 1939.　　　J. B. ARMITAGE　　　2,182,421
MILLING MACHINE
Filed June 20, 1936　　　10 Sheets-Sheet 4
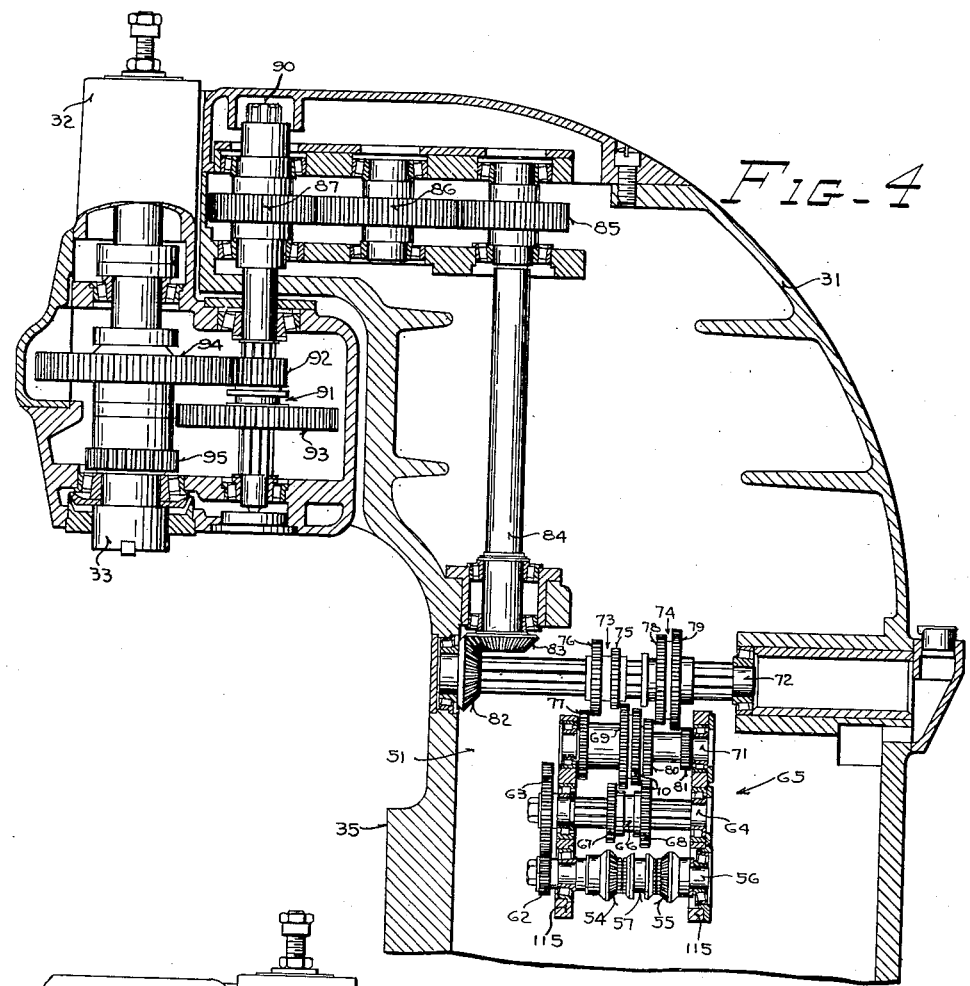
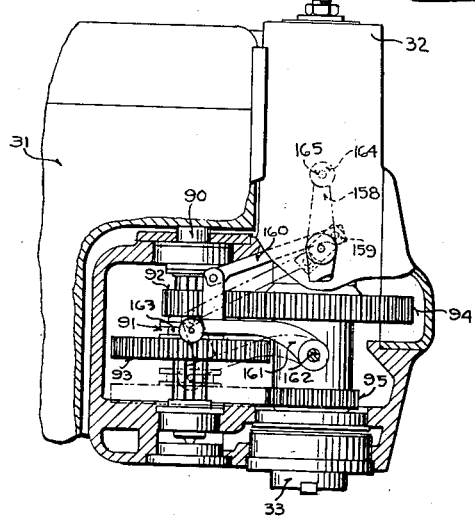
INVENTOR
JOSEPH B. ARMITAGE
BY W. D. O'Connor
ATTORNEY

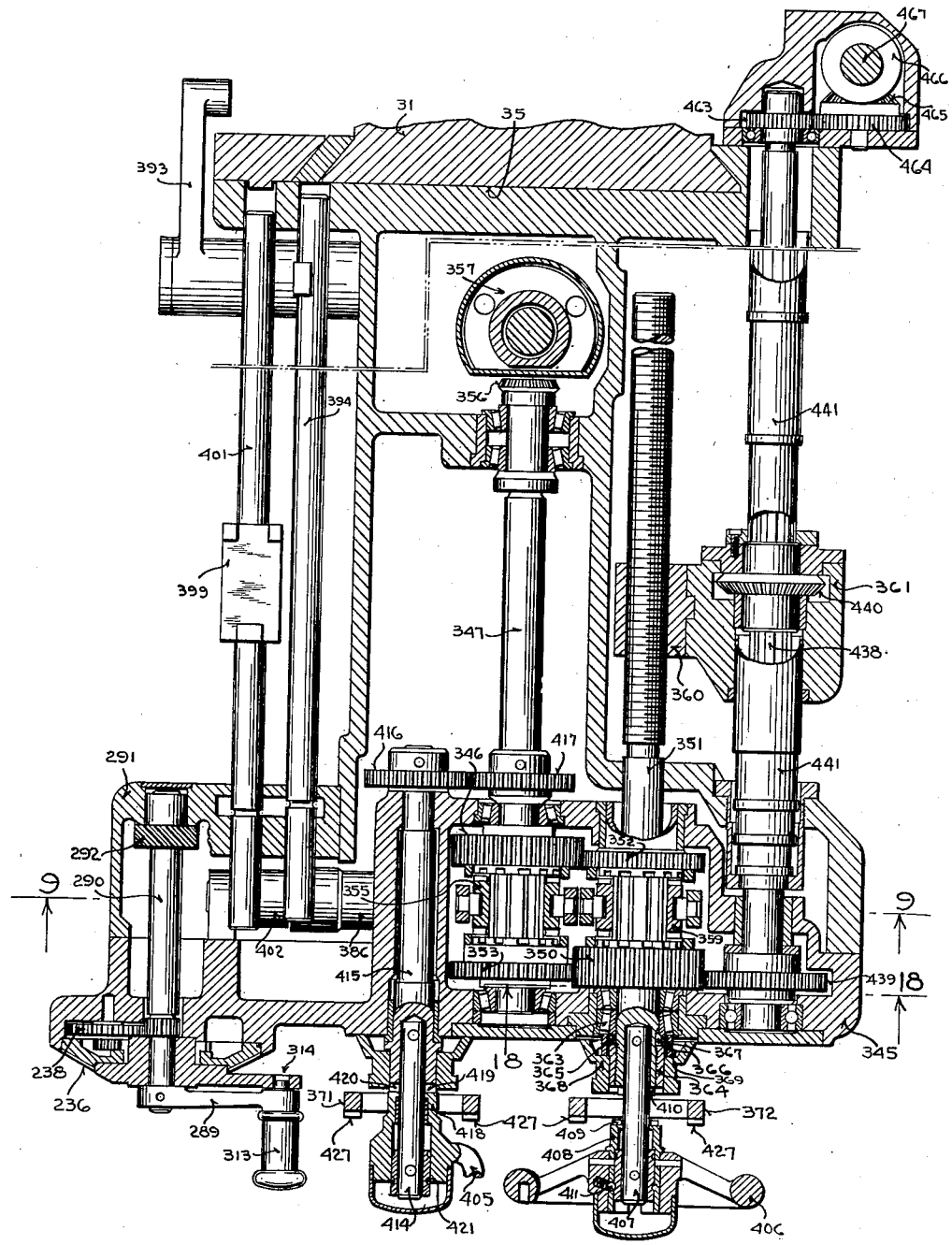

Dec. 5, 1939.　　　　J. B. ARMITAGE　　　　2,182,421
MILLING MACHINE
Filed June 20, 1936　　　10 Sheets-Sheet 6

INVENTOR
JOSEPH B. ARMITAGE
BY W. D. O'Connor
ATTORNEY

Dec. 5, 1939.   J. B. ARMITAGE   2,182,421
MILLING MACHINE
Filed June 20, 1936   10 Sheets-Sheet 7

INVENTOR
JOSEPH B. ARMITAGE
BY W. D. O'Connor
ATTORNEY

INVENTOR
JOSEPH B. ARMITAGE
BY W. D. O'Connor
ATTORNEY

Dec. 5, 1939.  J. B. ARMITAGE  2,182,421
MILLING MACHINE
Filed June 20, 1936  10 Sheets-Sheet 9
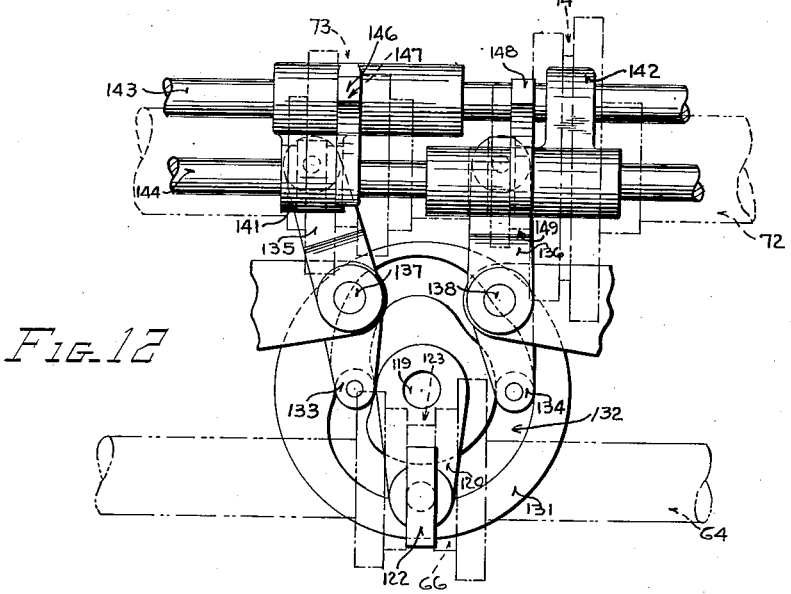
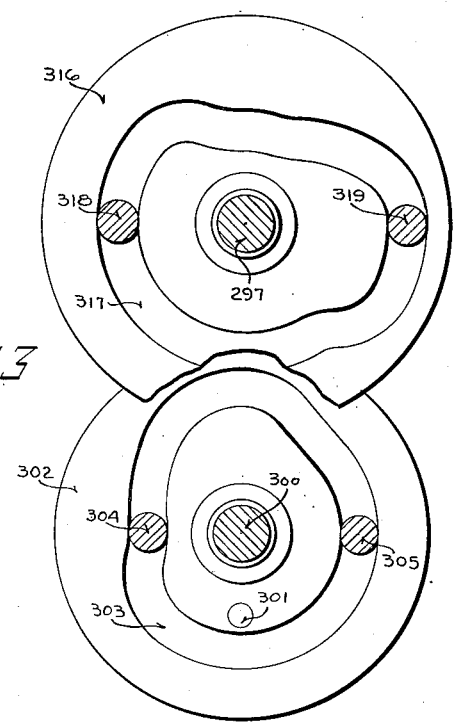
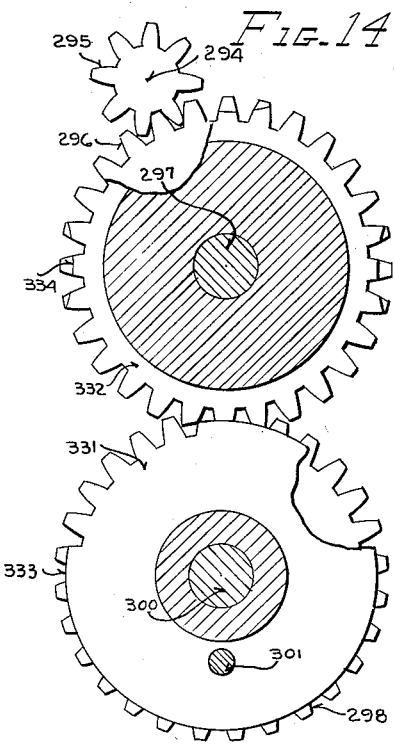
INVENTOR
JOSEPH B. ARMITAGE
BY W. D. O'Connor
ATTORNEY Dec. 5, 1939.  J. B. ARMITAGE  2,182,421
MILLING MACHINE
Filed June 20, 1936  10 Sheets-Sheet 10
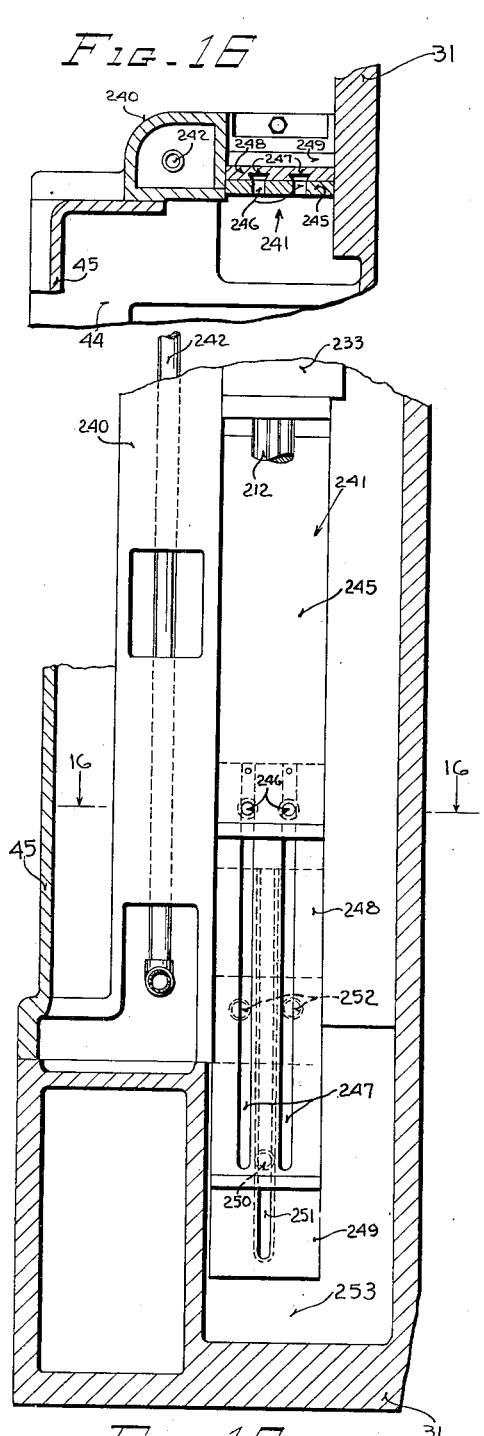
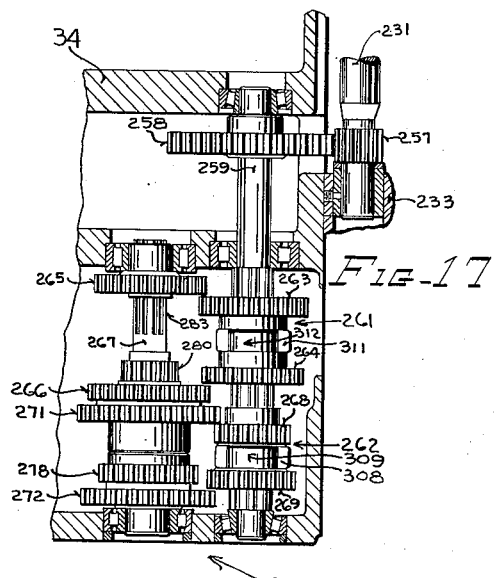
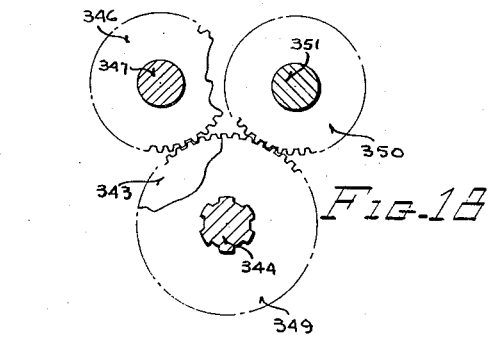
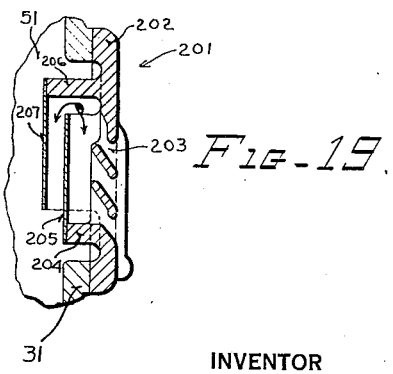
INVENTOR
JOSEPH B. ARMITAGE
BY W. D. O'Connor
ATTORNEY Patented Dec. 5, 1939

2,182,421

UNITED STATES PATENT OFFICE 2,182,421

MILLING MACHINE

Joseph B. Armitage, Wauwatosa, Wis., assignor to Kearney & Trecker Corporation, West Allis, Wis., a corporation of Wisconsin Application June 20, 1936, Serial No. 86,382

38 Claims. (Cl. 90—21)

This invention relates, generally, to improvements in milling machines, and more particularly to improved operating and controlling mechanism for effecting movements of the various tool supporting and work supporting parts of a milling machine.

A general object of the invention is to provide a milling machine of improved design that is convenient and safe to operate and that is of simple and rugged construction.

Another object of the invention is to provide a milling machine of the knee and column type in which improved rate changing mechanism and other control elements for the work feeding movements are carried by the knee of the machine.

Another object is to provide a milling machine in which the power transmission mechanism is entirely enclosed by improved telescoping guards.

Another object is to provide feeding mechanism for a movable work support of a machine tool that is arranged to be driven selectively along a plurality of paths of movement by either one of two constant speed shafts transmitting power to the movable work support.

Another object is to provide a milling machine of the knee type having independent reversing mechanisms carried by the knee for selectively controlling the feeding movements of the work supporting table in each of its three mutually perpendicular lines of movement.

Another object is to provide a milling machine of the knee type having independent reversing mechanisms in the knee for each line of movement of the work support and having two constant speed shafts transmitting power to the knee for actuating the work support at feed rate and at rapid traverse rate, respectively.

Another object is to provide safety means for a machine tool having work support moving mechanism arranged to be actuated by power means or by manually operated means selectively, the safety apparatus including means interlocking the power means and the manual means in manner to positively prevent the manual means from being rotated by the power operated means.

Another object is to provide convenient and direct means for effecting changes in the feeding rate of a milling machine.

Another object is to provide an improved control mechanism for the rapid traverse drive of a milling machine.

A further object is to provide in a machine tool, power transmitting means including shafts carried by a movable member in manner to move in a slot of a stationary member and having collapsible guards arranged to close the portions of the slot not occupied by the shafts.

A further object of the invention is to provide simple and convenient speed changing mechanism for a machine tool spindle including improved indicating means for ascertaining the speed to which the transmission is adjusted.

A further object is to provide a vertical milling machine of the sliding head type having a spindle speed changer including shifting mechanism carried in the sliding head and an operating lever mounted on the sliding head for adjusting the shifting mechanism.

A further object is to provide in a milling machine having a gear compartment, a hollow clutch control shaft extending through the gear compartment and constituting a conduit for electric control wiring.

A still further object is to provide in a milling machine having an enclosed gear compartment, means for ventilating the gear compartment to prevent condensation of moisture therein.

According to this invention as it is embodied in a milling machine of the vertical spindle knee and column type, the control mechanism for effecting movement of the work supporting table including independent reversers for each line of table movement, is carried by the vertically movable knee. Power for actuating the table in its several directions of movement is transmitted to the mechanism in the knee by two shafts carried thereby and each rotating at constant speed, one of the shafts transmitting power from the tool spindle driving train for moving the table at feed rate and the other shaft transmitting power from the power source independently of the spindle train for moving the table at rapid traverse rate. The two shafts are carried at one side of the knee in horizontal position suitably housed, and they extend rearwardly through a vertical slot at the side of the column for slidable driving connection with driven vertical shafts in a compartment of the column, the slot in the column compartment being closed by means of telescoping guard plates arranged above and below the shafts. A single feed rate change lever on the knee shifts the gears of the feed rate changer mounted in the knee and operates in conjunction with a feed indicating dial to select a desired feeding rate. Independent reversing and disconnecting means are provided for selectively controlling the feed of the table in each of its lines of movement and interlocking means positively prevent the elevating and cross traversing hand cranks from being rotated by power. Rapid traverse movement of the table is effected through the individual reversers by means of a friction clutch selectively operable to connect all of the reversers to the rapid traverse shaft, an overrunning clutch in the feed train permitting rotation of the reversers at rapid traverse rate. Power for rotating the spindle is transmitted through a bevel gear reversing mechanism that also functions to turn the direction of drive through a right angle. The spindle speeds may be selected by means of a simplified speed changing mechanism operated by shifting levers arranged to cooperate with a circular chart to indicate the selected speed, one of the shifting levers being carried by the sliding head for actuating a supplemental speed range changer therein. Guarded louvers are provided for ventilating the speed change gear compartment in the column, and electrical control wires from a switch at the top of the column are carried down through the gear compartment within a vertically disposed hollow clutch operating shaft to the motor in the base of the column.

The foregoing and other objects of the invention, which will become more fully apparent from the following detailed specification, may be achieved by the particular milling machine described herein by way of example as a preferred embodiment of the invention, in connection with the accompanying drawings, in which:

Fig. 2 is a view of the machine in right side elevation with parts broken away to show internal mechanism;

Fig. 3 is a view partly in front elevation and partly in vertical medial section through the lower portion of the milling machine column showing part of the driving mechanism in the column;

Fig. 4 is a view partly in vertical medial section and partly in right side elevation of the upper part of the milling machine column showing the spindle driving mechanism;

Fig. 5 is a view in horizontal section of the knee portion of the machine taken approximately along the line 5—5 of Fig. 6 with parts broken away;

Fig. 12 is a detailed elevational view partly in phantom, of the spindle speed changing mechanism taken approximately as indicated by the line 12—12 of Fig. 3;

Fig. 13 is a detailed view of the work feeding rate changing mechanism partly in elevation and partly in section taken approximately along the line 13—13 of Fig. 9;

Fig. 14 is another detailed view of the rate changing mechanism partly in elevation and partly in section taken approximately along the line 14—14 of Fig. 9;

Fig. 15 is a fragmentary view in vertical section taken approximately along the line 15—15 of Fig. 2;

Fig. 16 is a fragmentary view in horizontal section taken along the line 16—16 of Fig. 15;

Fig. 17 is a fragmentary view in generally horizontal section taken approximately along the line 17—17 of Fig. 9;

Fig. 18 is a detailed view partly in vertical section taken approximately along the line 18—18 of Fig. 5;

Fig. 19 is a fragmentary view of a ventilating louver taken in vertical section along the line 19—19 of Fig. 2;

Fig. 20 is a schematic view representing the drive mechanism to the constant speed shafts for actuating the feed mechanism;

Fig. 21 is a fragmentary view in vertical section taken approximately along the line 21—21 of Fig. 2 showing the actuating mechanism for the sliding head;

Fig. 22 is a view of the sliding spindle supporting head in left side elevation with parts broken away to show the gear shifting mechanism; and Fig. 23 is a fragmentary view showing the clutch operating shaft and the motor control wiring, partly diagrammatically and partly in vertical section taken approximately along the line 23—23 of Fig. 1.

Figure 1:
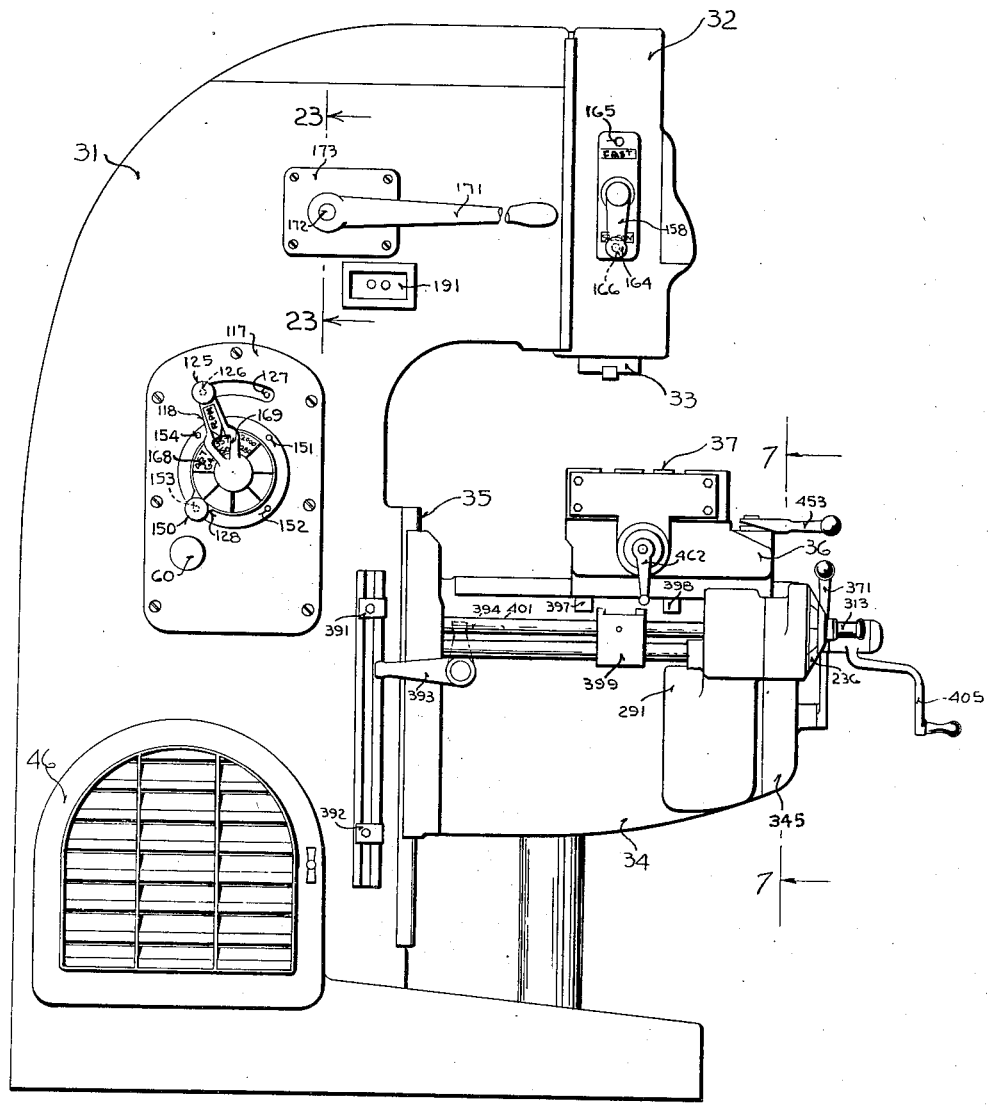
Figure 1 is a view in left side elevation of a vertical spindle knee type milling machine embodying the novel features of this invention.

Referring more particularly to the drawings, the milling machine illustrated therein as an example of preferred structure embodying the features of this invention, is of the vertical spindle knee and column type. As shown in Figs. 1 and 2, the machine comprises essentially an upstanding combined base and column 31 that carries at its upper forward end a vertically movable head 32 constituting a sliding tool supporting structure in which a vertically disposed tool spindle 33 is rotatably mounted, thereby providing for vertical feeding movement of a cutter that may be carried in the spindle. Beneath the tool spindle 33 there are arranged the usual superimposed relatively movable work supporting members, also movably carried by the column, the primary member being a knee 34 slidably mounted for vertical movement along the forward face 35 of the column. The knee 34 carries a saddle 36 slidably mounted thereon for horizontal movement toward or from the face of the column and that functions to carry a work supporting table 37 mounted thereon for horizontal longitudinal reciprocating movement transversely to the axis of the tool spindle 33 in manner to feed a work piece to a cutter mounted in the spindle.

Power for moving the various movable parts of the machine, including that for rotating the tool spindle 33 and for effecting feeding movements of the work supporting table 37 and of the spindle supporting head 32, is derived from a motor 38 that is mounted in a motor compartment 39 in the lower part of the column 31 and disposed transversely thereof, as shown in Fig. 3. The motor 38 is provided with a driving pulley 40 operatively connected by belts 41 to a driven pulley 42 on the extending end of a horizontally disposed hollow main driving shaft 43.

As shown in Figs. 2 and 3, the pulleys 40 and 42 and the connecting belts 41 are disposed within a belt compartment 44 at one side of the column 31 that communicates in its lower portion with the motor compartment 39 and that is made accessible by means of a large door 45 hingedly mounted on the right side of the column and constituting a cover enclosing the belt drive mechanism. The door 45 is provided with ventilating louvers through which air may pass to cool the motor 38, there being another door 46 on the left side of the column of sufficient size to admit the motor 38 and that is also provided with similar louvers to permit free passage of cooling air through the motor compartment 39 from the one to the other side of the column as shown in Fig. 3. To provide for tightening the belts 41, the motor 38 is mounted on a hinged plate 47 that may be adjusted in vertical position by means of an adjusting screw 48 in well known manner. For promoting circulation of air through the motor compartment 39, a fan 49 is provided on the motor shaft in position to operate in a passageway 50 between the belt compartment 44 and the motor compartment 39, the passageway constituting in effect a shroud ring for the fan.

The hollow main driving shaft 43 extends from the belt compartment 44 through the side of the column 31 into a spindle driving gear train compartment 51 that is disposed in the column above and separated from the motor compartment 39 and that contains the spindle speed changing mechanism and lubricating means for the gearing thereof. The driven pulley 42 may be selectively connected to drive the shaft 43, by means of a friction clutch 52 carried on the end of the shaft 43 extending within the belt compartment 44. The shaft 43 is connected at its other end, within the gear compartment 51, to a bevel pinion 53 that meshes with two cooperating bevel pinions 54 and 55 rotatably mounted on a shaft 56 journaled in the column at right angles to the shaft 43, in manner to constitute a reversing mechanism for the spindle driving train. As may be seen in Fig. 4, there is provided between the two bevel pinions 54 and 55 a clutch spool 57 that is slidably splined on the shaft 56 and that is operative to connect either one or the other of the bevel pinions to the shaft for rotation thereof selectively in one or the other direction. Movement of the clutch spool 57 to reverse the direction of drive may be effected by a shifter yoke 58 having shoes engaging the groove of the clutch spool and that is pivotally mounted within the compartment 51 as shown in Fig. 3 in manner to be turned by means of a longitudinally slidable reversing plunger 59 that extends externally of the column at the left side thereof and is provided with a projecting knob 60 for manual movement in or out to either one of two positions, as determined by a detent mechanism 61, corresponding with the two positions to which the clutch spool 57 may be moved for engaging the bevel pinion 54 or 55 respectively to drive the spindle 33 in one or the other direction. The bevel pinion 53 on the shaft 43 and the cooperating bevel pinions 54 and 55 on the shaft 56 constitute both a means for effecting selective reversal of the direction of rotation of the shaft 56 relative to the main shaft 43 and means for turning the direction of power transmission through a right angle.

The shaft 56 has fixed to one end a pinion 62, Fig. 4, that meshes with a gear 63 on the end of a parallel shaft 64 constituting part of a primary element of a spindle speed rate changing mechanism that is generally denoted by the numeral 65 and that may be adjusted to select the rate of speed at which the tool spindle 33 is to be operated. The main driving shaft 43, the reversing mechanism and the speed rate changer 65 constitute parts of the driving train forming the spindle driving means. As shown in Fig. 4, the pinion 62 and the gear 63 are held on their respective shaft ends by nuts in such manner that they may be removed readily for replacement by a gear pair of a different ratio to provide a different range of operation of the speed rate changing mechanism. Splined on the shaft 64 is a sliding gear couplet 66 having gears 67 and 68 arranged to be selectively meshed one at a time with cooperating gears 69 and 70 respectively that are fixed on a parallelly journaled shaft 71.

Above the shaft 71 there is journaled another parallelly disposed splined shaft 72 constituting part of another or secondary element of the rate changer 65 and carrying slidably mounted gear couplets 73 and 74. The slidable couplet 73 includes gears 75 and 76 disposed to be cooperatively meshed one at a time respectively with the gear 69 on shaft 71 and a gear 77 also fixed on shaft 71. The sliding couplet 74 has two gears 78 and 79 disposed to be meshed one at a time with cooperating gears 80 and 81, respectively, fixed on the shaft 71. By suitably positioning the gear couplets 66, 73, and 74, power at any one of eight speed rates may be transmitted from the shaft 64 through the gears fixed on the shaft 71 to the shaft 72.

The shaft 72 is provided at its forward end with a beveled pinion 82 that meshes with a similar cooperating beveled pinion 83 on the lower end of a shaft 84 journaled vertically in the upper part of the column 31. The shaft 84 is provided at its upper end with a spur gear 85 meshing with an idler gear 86 through which power is transmitted to a gear 87 journaled in thrust bearings in the forwardly projecting top portion of the column 31 and that is provided with an internally splined hub having sliding engagement with a vertically disposed splined shaft 90.

The splined shaft 90 extends downward from the top portion of the column into and is rotatably mounted in a rearwardly projecting lower portion of the vertically slidable head 32 of the milling machine in such manner that it may move up and down with the head and at the same time maintain rotatable driving connection with the gear 87 in the column by reason of the splined connection between the shaft and the hub of the gear. As shown in Fig. 4, the splined shaft 90 is provided at its lower part within the sliding head 32 with a gear couplet 91 slidably splined thereon. The gear couplet 91 includes a relatively small pinion 92 and a relatively large gear wheel 93 that are adapted to be meshed one at a time respectively with a gear wheel 94 and a pinion 95 fixed on the tool spindle 33 within the sliding head 32, the cooperating gearing constituting a supplement or tertiary speed rate changing mechanism for the spindle driving train.

The spindle carrying head 32 may be moved vertically relative to the column 31 by means of a hand wheel 98 that is shown in Fig. 2 projecting forward at the right side of the sliding head 32 on the end of a shaft 99 journaled in a bracket 100 that is fastened to the side of the column. The shaft 99 is provided at its inner end with a beveled pinion 101 that meshes with a beveled pinion 102 on a shaft 103 journaled in the bracket 100 at right angles to the shaft 99. As shown in the sectional view, Fig. 21, the shaft 103 is provided at its inner end with a spur gear 104 that meshes with an idler gear 105 to transmit movement therethrough to a gear 106 on a shaft 107 journaled in the side wall of the column.

The shaft 107 is provided at its inner end within the column with a bevel pinion 108 that meshes with a bevel gear 109 fixed on an internally threaded sleeve or nut 110 that is rotatably mounted in thrust bearings in the upper forward end of the column 31. The internally threaded sleeve 110 engages a threaded rod 111 that extends downwardly generally parallel with the shaft 90 through the bottom of the forward end of the column and is rigidly secured in the upper wall of the rearwardly extending portion of the sliding head 32 by means of a nut 112. By reason of the fact that the rod 111 is fixed with the sliding head 32, it operates to move the sliding head up or down along ways on the forward face of the upper end of the column when the threaded sleeve 110 is turned by its operating gear train.

As may be best seen in Fig. 3, shafts 56, 64, and 71 of the primary and secondary speed changing mechanisms in the spindle driving train are journaled in a removable supporting box structure 115 that is fitted within the gear compartment 51 of the column through an opening 116 in the left side thereof which is closed by a panel 117 formed integrally with the supporting box 115 and attached to the column by screws or the like. The supporting box 115 also carries the reversing mechanism including the actuating plunger 59, and in addition it carries actuating mechanism for shifting the slidable gear couplets.

As shown in Figs. 3 and 12, the gear couplet 66 of the primary rate changer may be moved axially along the shaft 64 to either of its operative positions by means of a primary shifting lever 118 pivotally mounted on the cover plate 117 by means of an inwardly extending shaft 119 having at its inner end a crank arm 120 that carries a pivotally mounted shifting shoe 122 disposed to engage an annular groove 123 in the gear couplet 66. The primary shifting lever 118 is provided with a handle 125 having a locating plunger adapted to enter either of two positioning holes 126 or 127 in the cover plate 117 as shown in Fig. 1, the positioning holes corresponding respectively to the positions assumed by the lever in placing the gear couplet 66 in the one or the other of its two operating positions.

Mounted concentrically with the primary shifting lever 118 is a secondary shifting lever 128 that is carried on a sleeve 129 which encircles the shaft 119 and extends through the cover plate 117. The inner end of the sleeve 129 is attached to a cam disk or plate 131, best shown in Fig. 12, provided on its inner face with a cam groove 132. The cam groove 132 is arranged to receive at diametrically opposite positions cam followers 133 and 134, respectively, the cam followers being mounted on the ends of rocker arms 135 and 136 that are pivotally mounted on pins 137 and 138 in the support box 115. The rocker arms 135 and 136 slidably engage at their upper ends with gear shifters 141 and 142 respectively that are guided for horizontal sliding movement parallel with the shaft 72 on a pair of spaced guide bars 143 and 144 mounted in the column 31. The gear shifter 141 is provided with an inwardly extending shifting fork 146 that engages a groove 147 of the gear couplet 73, and a gear shifter 142 is provided with an inwardly extending shifter fork 148 that engages a groove 149 in the gear couplet 74.

The cam groove 132 of the cam plate 131 is so shaped that only one of the gears of the gear couplets 73 and 74 may be engaged with a cooperating gear on the shaft 71 at any one time, and it is so arranged that each of the four gears of the couplets will be engaged in turn with its cooperating gear for each quarter of a revolution of the cam plate. As may be seen in Fig. 1, the secondary operating crank 128 is provided with a handle 150 having a locating plunger that is adapted to engage any one of four positioning holes 151, 152, 153, and 154, which correspond with the four positions assumed by the crank 128 in successively moving each of the four gears of the secondary rate changer into operating position.

The arrangement for shifting the gear couplet 91 of the supplemental or tertiary speed changer mounted in the sliding head 32 is shown in Fig. 22. As there shown, shifting of the gear couplet 91 to effect a major range change in speed is accomplished by means of a shifting crank or lever 158 that is pivotally mounted in the side of the sliding head 32 in manner to be carried thereby for bodily movement with the sliding head. The shifting crank 158 is mounted on a short shaft extending through the side wall of the head 32 and having at its inner end a crank 159 to which is pivotally connected one end of a link 160. The link 160 is pivotally connected at its other end to an upstanding lug formed on a bell crank gear shifting yoke 161 that is pivotally mounted at one end, by means of pivot pins 162, in the side walls of the sliding head 32. The other end of the yoke 161 is provided with pivoted shoes disposed to engage a groove 163 of the gear couplet 91. The shifting crank 158 is provided with an operating handle 164 having a locating pin disposed to engage either of two positioning holes 165 and 166 arranged in vertical alignment with the pivot axis of the crank, as shown in Fig. 1. When the crank 158 is moved to its lower position with the pin of the operating handle 164 engaging the lower positioning hole 166, as shown in Fig. 1, the shifting linkage is positioned as shown in full lines in Fig. 22. In this position the gear couplet 91 is raised to engage the pinion 92 thereof with the large gear wheel 94 on the spindle 33, whereupon the spindle will be driven in the slow major speed range. When the shifting crank 158 is moved to its upper position with the locating pin engaging the positioning hole 165, as shown in dotted lines in Fig. 22, the gear couplet 91 is moved to its lower position with the large gear wheel 93 thereof in engagement with the small gear wheel 95 on the spindle 33 in manner to drive the spindle in its fast major speed range. With the gear couplet 91 positioned in either of its two positions, causing the tertiary rate changer in the sliding head to establish either a fast or a slow major speed range, the primary and secondary speed rate changing mechanisms may be adjusted to any combination of positions by the operating levers 118 and 128 to effect a series of eight speed changes for each of the major speed ranges, whereby a total of sixteen different spindle speed rates are made available in the two ranges.

For indicating the rate of speed of the spindle 33 resulting from the setting of the three rate changers, the lever 128 is provided with a circular dial or chart 168, Fig. 1, that is rotatable therewith and that is divided into four quadrants corresponding with the four positions that may be assumed by the lever 128 in shifting the gear couplets 73 and 74 of the secondary rate changer. As shown in Fig. 1, each of the quadrants of the circular chart 168 is divided into two sectors, and the shifting lever 118 of the primary rate changer is provided with an opening or window 169 through which one or the other of the sectors of one quadrant may be observed, depending upon the position of the lever 118. As shown, the lever 118 operates over the quadrant of the chart 168 which happens to be uppermost as the result of positioning the lever 128 to engage the locating pin thereof with one or another of the four positioning holes, and the window 169 of the lever 118 may be brought into register with either the left or the right sector of the upper quadrant upon engaging the locating pin of the lever 118 with either one or the other of the cooperating positioning holes 126 and 127. Each sector of the chart 168, as observed through the registered window 169, presents two indicia, in this instance figures representing spindle speeds, the indicia being arranged upon the chart 68 in inner and outer concentric circles or rows. The two indicia observed through the window 169 represent the two speeds at which the spindle 33 may be operated by changing the position of the shifting lever 158 on the sliding head 32 from the one to the other major speed range, the shifting levers 118 and 128 remaining stationary. The two positions of the shifting lever 158 on the sliding head are designated by indicating means, in this instance the words "Fast" and "Slow" respectively, that serve to identify the row of indicia that is to be read within the window 169 to ascertain the speed to which the transmission is adjusted as the combined result of positioning the three crank arms. As shown, the figures representing the speeds in the slow major range, are arranged in the inner circle and the figures representing the speeds of the fast major range are arranged in the outer circle of indicia on the chart 168.

Starting and stopping of the spindle 33 is controlled by the main clutch 52 which may be engaged or disengaged by means of a main starting lever 171 shown in Fig. 1 pivotally mounted on the upper left side of the column. As shown in Fig. 23, the starting lever 171 is secured to the outer end of a shaft 172 that is journaled in a housing box 173 set into the side of the column in manner to project into the chamber 51 containing the spindle driving train. The shaft 172 has at its inner end within the housing 173 a bevel pinion 174 that meshes with a similar bevel pinion 175 on the upper end of a hollow clutch operating shaft 176 extending downwardly through the gear chamber 51. The clutch shaft 176 is provided at its lower end with a spur pinion 177 meshing with rack teeth 178 on a horizontally slidable clutch operating shifting bar 179. The bar 179 is provided with a shoe or yoke 180 disposed to engage a groove of a clutch operating collar 181, Fig. 3, that is slidably mounted on the main driving shaft 43 within the gear compartment 51. A detent mechanism 182 is arranged in conjunction with the shifting bar 179 to retain it in either one of two positions. The clutch shifting collar 181 has associated with it a spindle brake 183 that functions to stop the shaft 43 and consequently to stop rotation of the spindle 33 when the lever 171 is moved to disengage the clutch 52. For actuating the clutch, the shifting collar 181 is operatively connected with a clutch actuating rod 184 extending longitudinally through the hollow shaft 43 and having at its outer end a cone or bell member 185 so arranged that when the rod 184 is moved outwardly the bell 185 will engage and force outward a plurality of clutch operating fingers 186 to engage the clutch. Upon the shifting collar 181 and the actuating rod 184 being moved inwardly or to the left, as seen in Fig. 3, the bell 185 is moved to permit the fingers 186 to move inwardly thereby disengaging the clutch 52, and at the same time the spindle brake 183 is engaged to stop rotation of the spindle driving train.

For starting and stopping the motor 38, a push button switch 191 is provided on the left side of the column 31 near the clutch lever 171, as shown in Fig. 1, in convenient position to be reached by the machine operator. As the push button switch 191 is positioned in the upper part of the gear chamber 51, and as it is desirable that all wiring be enclosed within the column, it is necessary to conduct a control cable 192 from the switch 191 downward through the gear compartment 51 and through the bottom wall thereof into the motor compartment 39 to the motor 38. In order that the control cable 192 may be protected from lubricant in the gear compartment 51 and from mechanical damage, it is conducted downward through the compartment 51 inside of the hollow clutch operating shaft 176. As shown in Fig. 23, the cable 192 enters the upper end of the hollow shaft 176 within the housing 173, which serves as a protecting casing, the cable being brought up from the switch 191 through an opening 193 in the outer lower portion of the housing.

The portion of the cable 192 which extends from the lower end of the hollow shaft 176 is protected from contact with lubricant in the compartment 51 by means of a tubular conduit 194 that passes through and is fixed in the wall separating the gear compartment 51 from the motor compartment 39. To prevent lubricant from entering the shaft 176, the upper end of the tubular conduit 194 extends upwardly within the lower end of the hollow shaft 176 in telescoping relation therewith. The portion of the cable 192 extending from the lower end of the conduit 194 into the enclosed motor compartment 39 is connected at its end to the motor 38.

In order to provide for ventilating the gear compartment 51, there is arranged in the right side of the column 31 a baffled louver or breather 201, shown in Fig. 2 and in vertical section in Fig. 19. The baffled louver 201 comprises an escutcheon plate portion 202 that is fastened to the outside of the column by screws and that is provided with louver openings 203 arranged to prevent entrance of foreign matter into the column. To prevent the escape of lubricating oil from the chamber 51 through the louver structure 201, the plate portion 202 is provided on its inner side with baffle plates. As shown in Fig. 19, there is provided near the lower edge of the louver plate an inwardly projecting flange 204 which carries an upwardly extending baffle plate 205. Near its upper edge the louver plate is provided with an inwardly extending flange 206 somewhat longer than the flange 204 and that carries a downwardly extending baffle plate 207 disposed in overlapping spaced relation with the baffle plate 205 in such manner that air flowing into or out of the column must follow the circuitous path indicated by the arrows in Fig. 19, the overlapping baffle plates effectively preventing escape of lubricant which may be thrown against them from the gearing within the compartment 51.

Power for moving the work supporting table 37 relative to the tool spindle 33 along its three lines of movement, is transmitted to the knee by means of two shafts rotating at constant speed, one shaft transmitting power for feeding movements and the other shaft transmitting power for movement of the work table at rapid traverse rate. As shown in Fig. 2 there is provided within the belt compartment 44 at the forward right corner of the column 31, two vertically disposed splined shafts 211 and 212 that are arranged for transmitting power at feed rate and at rapid traverse rate respectively. The shaft 211 is provided at its upper end with a worm wheel 213 meshing with a worm 214 fixed on a horizontal shaft 215 disposed parallel with the main driving shaft 43. As shown diagrammatically in Fig. 20, the horizontal shaft 215 extends into the gear compartment 51 and is provided on its inner end with a spur gear 216 that meshes directly with a similar spur gear 217 fixed on the main driving shaft 43, thus constituting a driving train arranged to rotate the vertical splined shaft 211 continuously whenever the main shaft 43 is being driven by the pulley 42 through the clutch 52, the speed of the shaft 211 having a constant relation to the speed of the pulley 42.

As shown in Fig. 3, the driving pulley 42 is provided with an inwardly extending supporting hub or sleeve 218 that encircles the driving shaft 43 and that is journaled in a clutch pulley bracket 219 secured in the side of the column 31. At its inner end the sleeve 218 is fitted with a spur gear 220 for driving the rapid traverse shaft 212 and that meshes with a similar spur gear 221 rotatably mounted on a pivot pin 222 carried by the clutch bracket 219. As shown diagrammatically in Fig. 20, the gear 221 on the pin 222 meshes with another gear 225 which in turn meshes with a gear 226 on the inner end of a horizontal shaft 227 extending through the bracket 219 parallel with the shaft 215. The outer end of the shaft 227 is provided with a worm 228 that meshes with a worm wheel 229 on the upper end of the vertical splined shaft 212, thus constituting a gear train directly connecting the vertical shaft 212 with the driven belt pulley 42 in such manner that the shaft 212 will be rotated continuously whenever the pulley 42 is rotating and at a speed having a constant relation with the pulley speed.

Power is transmitted at constant speeds from the two vertically disposed splined shafts 211 and 212, to two correspondng horizontally disposed shafts 231 and 232, respectively, that are carried by the vertically movable knee 34. As shown in Fig. 2, the shafts 231 and 232 are journaled in a housing or bracket 233 carried on the right side of the knee and extending rearwardly into the belt compartment 44 and into cooperating relation with the vertical shafts 211 and 212. As shown, the vertical shaft 212 passes downward through the end of the bracket 233 in operative engagement with a bevel pinion 234 that is journaled in the bracket 233 in manner to slide vertically along the splined shaft 212 and to maintain driving connection therewith for any position of the knee 34 along the vertical face 35 of the column. The bevel pinion 234 meshes with a similar bevel pinion 235 fixed on the end of the shaft 232, whereby the shaft 232 is driven at constant speed by a gear train extending directly from the driven pulley 42 for effecting movement of the work table at rapid traverse rate.

The vertical splined shaft 211 is slidably engaged by a splined sleeve gear 236 that is rotatably mounted in a rearward extension of the bracket 233 in manner to move vertically with the knee 34 and to maintain driving connection with the shaft 211. The gear 236 meshes with a similar gear 237 journaled in the bracket 233 concentric with the shaft 212 just below the bevel pinion 235 of the shaft 232. The gear 237 is provided with a bevel pinion 238 which meshes with a bevel pinion 239 on the end of the shaft 231, whereby the shaft 231 is driven by a gear train extending from the pulley 42 through the clutch 52 in manner to drive the shaft 231 at constant speed when the spindle clutch 52 is engaged, for effecting feeding movement of the work table 37.

As best shown in Figs. 15 and 16, the bracket 233 extends rearwardly past the corner of the column 31 into the belt compartment 44 and is engaged at its outer side by a corner post or guide member 240 that is spaced from the wall of the column and defines therewith a slot 241 for vertical movement of the bracket 233. At its outer edge the corner bracket 240 is engaged by the forward edge of the door 45 constituting therefor a door jam member. To provide a convenient means for conducting coolant fluid to the cutter, the corner post 240 is formed hollow to receive a coolant pipe 242 that is connected at the lower end of the corner post to a coolant pump 243, Fig. 2, disposed in the bottom of the belt compartment 44 and operatively connected to be driven by the vertical shaft 211. The upper end of the coolant pipe 242 emerges from the corner post 240 above the top of the door 45 and may be connected in any well known manner for conducting coolant fluid to a cutter in the spindle 33.

In order to prevent foreign matter from entering the belt compartment 44 through the vertical slot 241 between the corner post 240 and the side of the column, there are provided in the slot above and below the bracket 233 collapsible closure elements or guards formed of telescoping plates, as may be seen in Fig. 2, that completely close the slot yet permit the bracket 233 to operate vertically.

As best shown in Figs. 15 and 16, the lower collapsible guard member includes a plate 245 that is secured to the lower surface of the bracket 233 and that is provided at its lower end with screws or rivets 246, the heads of which slidably engage dovetail grooves 247 in a second plate 248 in such manner that one of the plates may slide over the other in telescoping relation. The second plate 248 is likewise slidably connected with a third plate 249 by means of a screw 250 that engages a dovetail slot 251 in the plate 249. The plate 249 is in turn attached by screws 252 to the lower part of the column and a socket 253 is provided in the base of the column to receive the lower part of the plate 249 and to receive also the plates 245 and 248 when the knee 34 is moved to its lowest position relative to the column. The collapsible guard in the slot 241 above the bracket 233 is likewise constituted by three telescoping plates 254, 255 and 256 that are slidably associated in similar manner. The collapsible guards, in cooperation with the bracket 233, serve to close the slot 241 entirely thereby completely enclosing the drive mechanism that functions to transmit power from within the column 31 to the feed controlling mechanism which is entirely enclosed within the knee 34 and is arranged to be driven by either one or the other of the constant speed shafts 231 and 232 for moving the work support at selected rate.

Power for effecting feeding movements of the work supporting table 37 is transmitted to rate changing mechanism in the knee 34 from the horizontal shaft 231 in the bracket 233, as shown in Fig. 17, by means of a pinion 257 fixed on the end of shaft 231 that meshes with a gear wheel 258 fixed on a shaft 259 rotatably mounted in the knee in parallel relation with the shaft 231. The pinion 257 and the gear wheel 258 are of selected sizes to provide feeding rates throughout a predetermined range and they may be replaced by other gearing of another ratio to effect a different range of feeding rates. The shaft 259 is splined at its forward part and has slidably mounted thereon two gear couplets 261 and 262 respectively, constituting part of a feed rate changing mechanism 260 for regulating the rate at which a work piece on the table 37 may be fed relative to a tool in the spindle 33. The gear couplet 261 comprises two gears 263 and 264 respectively that are disposed to be shifted one at a time into engagement with cooperating gears 265 and 266 fixed to a parallelly disposed shaft 267. The gear couplet 262 comprises gears 268 and 269 that are disposed to be meshed one at a time with gears 271 and 272 also fixed on the shaft 267.

Figure 8:
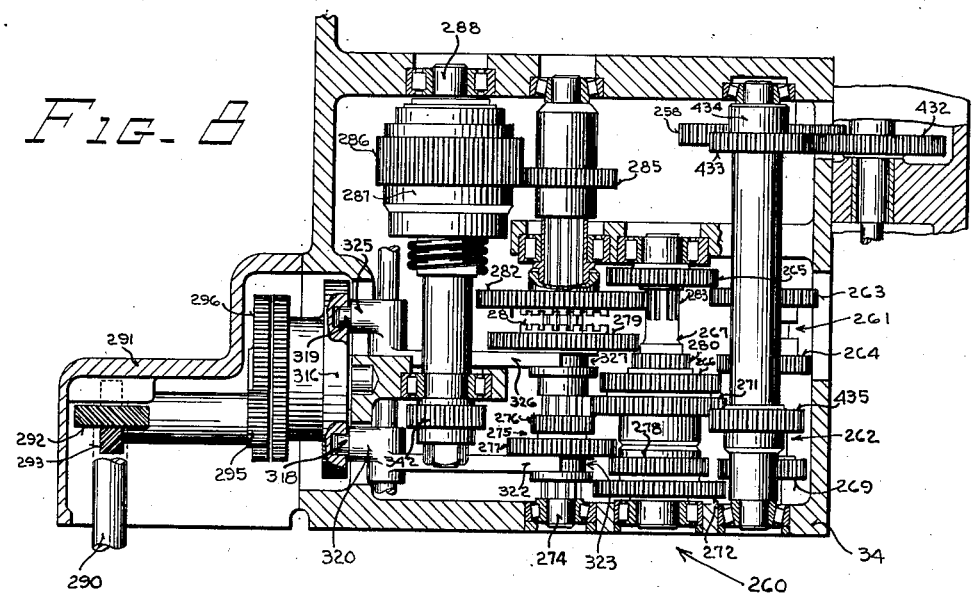
Fig. 8 is an expanded view of part of the knee in generally horizontal section taken approximately along the line 8—8 of Fig. 9.

At the other side of the shaft 267, as shown in Fig. 8, there is journaled a splined shaft 274 which has mounted at its forward end a gear couplet 275 comprising a gear wheel 276 and a gear wheel 277 that are arranged to be shifted one at a time into meshing engagement with the gear wheel 271 fixed on shaft 267 and a gear 278 also fixed on shaft 267. Back of the gear couplet 275 there is slidably mounted a clutch gear 279 that may be selectively meshed with a gear 280 fixed on the shaft 267, or when it is moved out of mesh with the gear 280, it may be moved to engage a clutch face 281 thereof with a complementary clutch face of a gear 282 rotatably mounted on the shaft 274. The gear 282 is arranged to mesh continuously with a pinion 283 formed on the shaft 267, the pinion 283 also functioning as a splined connection for fixing the gear 265 on the shaft 267.

From the shaft 274 power for feeding movements of the work supporting table is transmitted at the rate determined by the adjustment of the rate changing mechanism 260, by a spur gear 285 fixed on the shaft 274 at the back part thereof and meshing with a gear 286 mounted on an overrunning clutch mechanism 287 that is carried by a shaft 288 and is operatively associated therewith in manner to effect rotation of the shaft 288 at the feed rate determined by the rate changer 260 and to permit rotation of the shaft 288 in the same direction at a faster rate of speed when it is otherwise driven.

Figure 6:
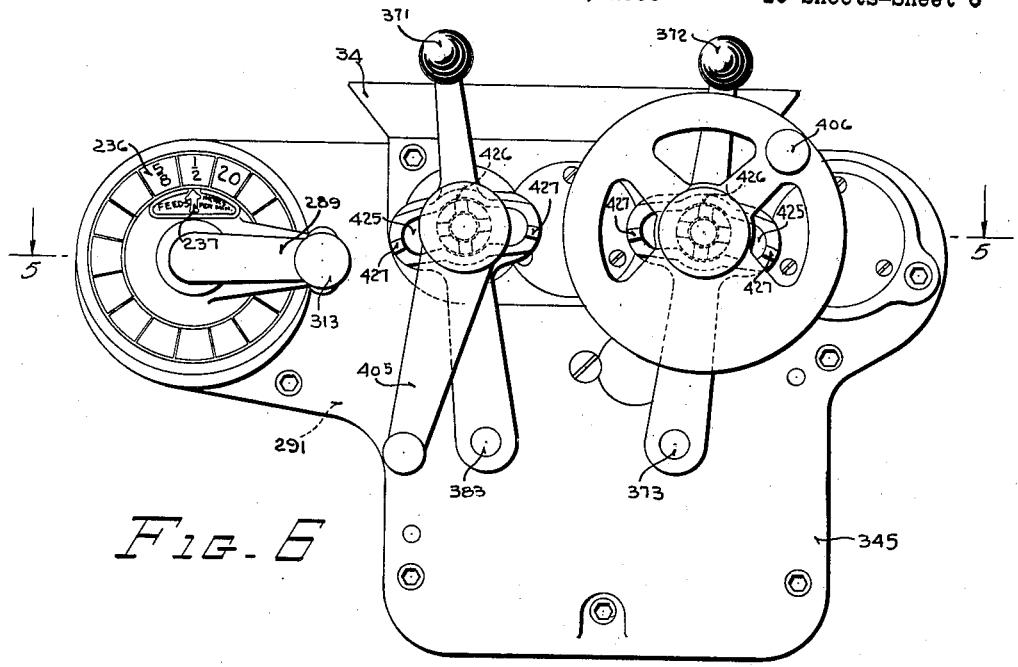
Fig. 6 is a view in front elevation of the milling machine knee showing the control levers.
Figure 9:
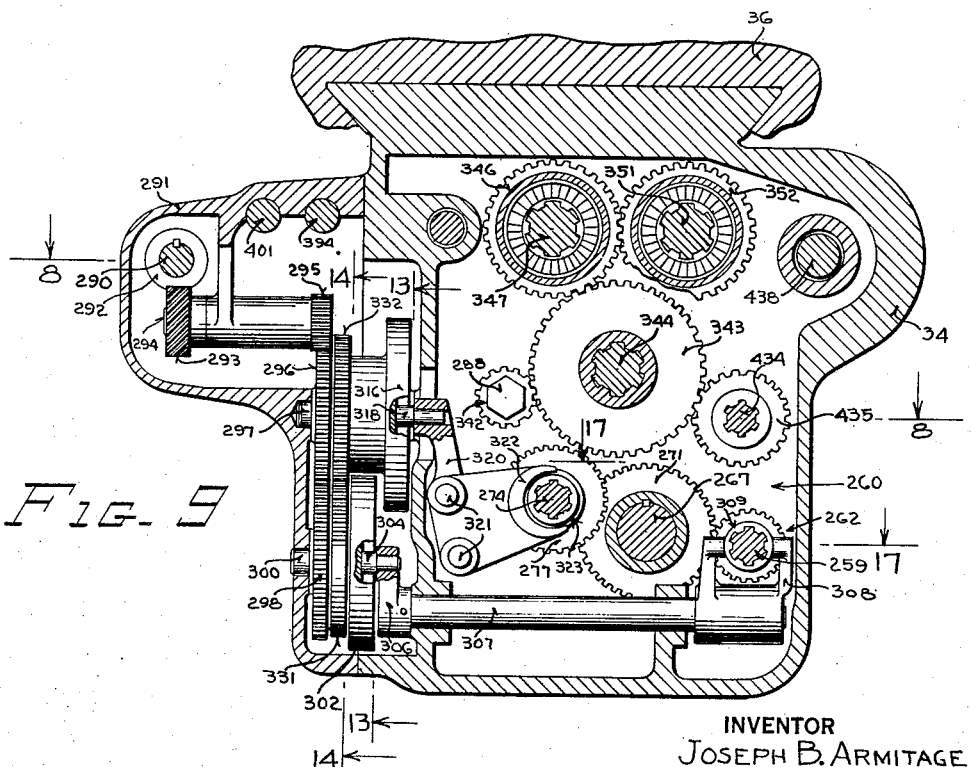
Fig. 9 is a view in vertical section similar to Fig. 7 but taken approximately along the line 9—9 of Fig. 5.

In order that the various gears of the feed rate changing mechanism 260 may be shifted conveniently to effect the desired rate of feed and to avoid the possibility of the mechanism becoming locked by the engagement of more than one gear on either the shaft 259 or the shaft 274 with the gears fixed on the shaft 267, there is provided a cam actuated shifting mechanism shown generally in Fig. 9. The shifting mechanism is operated by means of a shifting crank 289 rotatably mounted at the front of the knee 34 at the left side thereof as shown in Figs. 5 and 6. The shifting crank 289 is carried on a shaft 290 rotatably mounted at its inner end in a bracket 291 that is attached to the left side of the knee in manner to support the shaft 290 parallel with the shafts of the rate changer 260. The shaft 290 has fixed thereon near its inner end a spiral gear 292 which meshes with a similar spiral gear 293 shown in Figs. 8 and 9 mounted on the end of a shaft 294 that is journaled in the bracket 291 transversely of the shafts of the rate changer. The shaft 294 is provided at its inner end with a spur pinion 295 meshing with an idler gear 296 rotatably mounted on a pin 297 in the bracket 291 and that meshes with a gear 298 rotatably mounted on a parallel pin 300 and connected by means of a pin 301 to turn a disk cam 302.

As shown in Fig. 13, the disk cam 302 is provided in its inner face with a cam groove 303 that receives at diametrically opposite positions cam followers 304 and 305 respectively. As shown in Fig. 9, the cam follower 304 is carried by a crank arm 306 mounted on the left end of a shifting or rocking shaft 307 that is journaled in the lower part of the knee 34 transversely thereof. At the right end of the shaft 307 there is provided a shifting fork 308 disposed to engage a groove 309 in the gear couplet 262 in such manner that when the cam 302 is turned to rock the shaft 307, by reason of the cam groove 303 actuating the cam follower 304, the gear couplet 262 is shifted to engage either the gear 268 or the gear 269 with the gear 271 or the gear 272 respectively.

The cam follower 305 is likewise carried by a crank on the left end of a rocking shaft, the two being similar to the crank 306 and the shaft 307 and disposed directly back of said crank and shaft as viewed in Fig. 9. The rocking shaft associated with the cam follower 305 also has at its right end a shifting fork 311 similar to the shifting fork 308 of the shaft 307 and that appears in Fig. 17 in engagement with a groove 312 of the gear couplet 261. When the cam 302 is turned to cause the groove 303 to actuate the cam follower 305, the shifting fork 311 moves the gear couplet 261 along the shaft 259 in manner to selectively engage the gear 263 thereof with the gear 265 or the gear 264 with the gear 266. The cam groove 303 is so shaped as to actuate the shifting mechanism in such manner that only one of the gears 263, 264, 268, and 269 may be engaged with its cooperating gear on the shaft 267 at any one time, and the groove is so arranged that one of these gears will be engaged with its cooperating gear for each quarter of a revolution of the cam 302. The ratio of the gearing connecting the cam 302 with the shifting crank 289 is such that the cam 302 is turned through one-quarter of a revolution for each complete turn of the crank 289. As shown in Fig. 5, the crank 289 is provided with an operating handle 313 having a locating plunger disposed to engage a positioning hole 314 in a bracket carried by the knee, the shifting mechanism being so arranged that one of the gears of the couplets 261 and 262 is in full engagement with its cooperating gear whenever the locating pin is in engagement with the positioning hole 314.

For shifting the gear couplet 275 and the clutch gear 279 of the rate changer, there is provided another cam plate 316 which is rotatably mounted on the pin 297. As shown in Fig. 13, the cam plate 316 is provided with a cam groove 317 in its inner face that receives at diametrically opposite positions cam followers 318 and 319. As may be seen in Figs. 8 and 9, the cam follower 318 is carried by a shifting member 320 that is slidably mounted on parallel guide rods 321 for movement in direction parallel with the shafts of the rate changer. The shifting member 320 is provided with a shifting yoke 322 that engages a groove 323 in the gear couplet 275 in such manner that movement of the cam follower 318 by the cam groove 317 results in shifting the couplet 275 to selectively engage the gear 276 thereof with the gear 271 on the shaft 267 or to engage the gear 277 of the couplet with the gear 278 of the shaft 267.

The cam follower 319 is likewise carried by a shifting member 325, Fig. 8, also slidably mounted on the guide bars 321 and having a shifting fork 326 that engages a groove 327 of the clutch gear 279. Upon movement of the cam follower 319 by the cam groove 317, the clutch gear 279 is selectively caused to mesh with the gear 280 on the shaft 267 or to clutch the gear 282 to the shaft 274. As in the case of the cam 302, the cam groove 317 of the cam 316 is so shaped that only one operating connection at a time may be effected between the shaft 267 and the shaft 274, and the arrangement is such that one connection occurs for each quarter revolution of the cam 316.

To provide for a series of speed changes by the rate changer 260, the operation of the cam 316 is synchronized with that of the cam 302 in such manner that the cam 302 operates through its entire cycle following each quarter revolution of the cam 316, thereby providing a total of sixteen different combinations of gear engagements in the rate changer 260 thus effecting sixteen different rates of power transmission. For turning the cam 316, an intermittent gear drive is provided as shown in Fig. 14. Between the gear 298 and the cam 302, Fig. 9, there is provided a discontinuous gear wheel 331 which meshes with a cooperating mutilated gear wheel 332 formed integrally with the cam 16. As shown, the gear 331 is provided with only sufficient teeth to turn the gear 332 through one-quarter of a revolution for each revolution of the gear 331. After the gear 332 has been turned through one-quarter of a revolution and the teeth of the gear 331 have become disengaged from the teeth of the gear 332, the gear 332 is locked in position to prevent turning thereof by means of a cylindrical surface 333 of the gear 331 that engages a complementary depression 334 formed in the teeth of the gear 332, the cooperating gears functioning in the manner of a Geneva movement to effect intermittent rotation of the cam 316.

In order that the adjusting of the rate changer 260 may be visibly indicated, there is provided a circular feed rate indicating dial or chart 336 disposed concentric with the shaft 290 behind the crank 289 on the front of the knee. As shown in Fig. 6, the chart 336 is marked off in sixteen sectors each presenting an indicia representing a setting of the rate changer 260, the indicia being conveniently expressed in inches per minute of feed of the work table 37. The indicia of the chart 336 cooperate with a stationary indicating pointer 337 which indicates the segment at the top of the dial, and the dial 336 is connected to be driven from the shaft 290 by a gear train 338 shown in Fig. 5 and having a ratio of 16 to 1, whereby the dial is turned to bring successive adjacent indicia into register with the indicator 337 for each successive turn of the operating crank 289 to indicate successively the sixteen rates of feed.

Power for movement of the work supporting table relative to the tool spindle 33 in any of its three lines of movement is transmitted from the shaft 288, Figs. 8 and 9, at the rate determined by the setting of the rate changer 260 to three independently operating branches each including independent reversing mechanism, by means of a gear 342 fixed on the forward end of the shaft 288 and constituting a common driving member. The gear 342 meshes with a gear 343 carried on a shaft 344 which is journaled in a control bracket 345 that is secured to the front of the knee 34 as shown in Fig. 5. The gear 343 meshes with a wide faced gear 346 which is rotatably mounted on an elevating shaft 347 journaled in the upper part of the knee. As shown in Fig. 18 the shaft 344 carrying the gear 343 is also provided with another similar gear 349 disposed in the forward part of the bracket 345 and having meshing engagement with a wide faced gear 350 rotatably mounted on a cross traversing shaft 351 disposed parallel with the elevating shaft 347. By reason of their meshing engagement with the gears 343 and 349 respectively, the wide faced gears 346 and 350 are caused to rotate in the same direction. To provide for effecting reversal of the directions of rotation of the shafts, the wide faced gear 346 is meshed with a gear 352, Figs. 5 and 9, rotatably mounted on the shaft 351 and the wide faced gear 350 is meshed with a gear 353, Fig. 5, rotatably mounted on the shaft 347. By this arrangement the gears 346 and 353 on the shaft 347 are driven in opposite directions of rotation and likewise the gears 350 and 352 on the shaft 351 rotate oppositely. As shown in Fig. 5, the elevating shaft 347 is provided with a shiftable clutch sleeve 355 that is splined thereon between the gears 346 and 353 and that is provided at each end with clutch teeth disposed to cooperate with complementary clutch teeth of the gears in manner to selectively connect either the gear 346 or the gear 353 with the shaft 347, whereby the shaft 347 may be selectively driven in either direction. As appears in Fig. 5, the elevating shaft 347 is provided at its inner end with a bevel pinion 356 that is arranged to rotate an elevating screw mechanism 357 for moving the knee 34 vertically along the face 35 of the column 31, either up or down according to the direction of rotation of the shaft 347 depending upon the position of the clutch sleeve 355.

Figure 10:
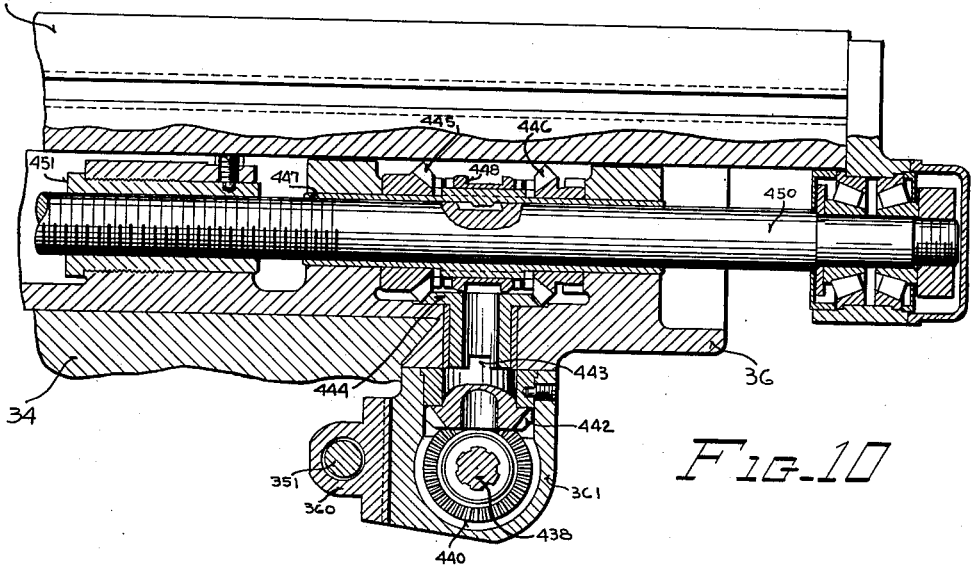
Fig. 10 is a view partly in front elevation and partly in vertical longitudinal section of a portion of the work supporting table taken approximately along the line 10—10 of Fig. 11.

Between the oppositely rotating gears 350 and 352 on the cross traversing shaft 351 there is provided a clutch collar 359 splined to the shaft in manner to slide thereon for selectively engaging clutch teeth at the ends thereof with complementary clutch teeth on the adjacent faces of the gears 350 and 352 respectively, whereby the shaft 351 may be rotated selectively in either direction. As shown in Fig. 5, the inner portion of the cross traversing shaft 351 within the knee is threaded and operates in a cooperating nut 360. The nut 360 is attached to the side of a bracket 361 depending from the saddle 36 as shown in Fig. 10 and secured thereto in such manner that the saddle and the table 37 supported thereon may be moved toward or from the column 31 upon rotation of the shaft 351 in the one or the other direction, as determined by the position of the clutch collar 359.

By means of the independent reversing mechanisms comprising the shiftable clutch collars 355 and 359, Fig. 5, vertical movement of the knee 34 and horizontal movement of the saddle 36 may each be controlled independently of movement of the other to provide any desired combination of simultaneous movement and to provide for moving either the knee or the saddle while the other remains stationary, its clutch collar being in intermediate or neutral position permitting the cooperating gears to rotate freely on the shaft.

To resist the thrust exerted by the shaft 351 in moving the saddle 36 along the top of the knee 34, there is provided at the front of the bracket 345 a double tapered roller anti-friction bearing 363 adapted to carry the radial load of the shaft 351 and also to carry thrust load in either direction. To avoid end play of the shaft 351 in the bearing 363, means more fully described and claimed in my co-pending application Serial No. 301,355, filed October 26, 1939, are provided for accurately adjusting the bearing to a predetermined degree of tightness. As shown in Fig. 5, an adjusting nut 364 is threaded on the shaft 351 in manner to bear against a slidably mounted collar 365 which in turn engages the inner race of the forward bearing in such manner that when the nut 364 is tightened the two inner bearing races are moved toward each other in manner to tighten the bearings. To lock the nut 364 in adjusted position, there is provided a locking collar 366 having internal serrations disposed to engage matching external serrations on the nut 364 and on the collar 365, respectively, the collar 365 being secured against rotation relative to the shaft by means of a key 367. The serrated locking collar 366 is retained in locking position by means of a collar 368 carrying a graduated micrometer dial and that is secured on the nut 364 by a locking screw or other means. To adjust the bearing 363 the collar 368 is detached and moved outwardly to permit the serrated locking collar 366 to be moved outwardly sufficient distance to disengage it from the external serrations of the keyed collar 365. A spanner wrench may then be applied to notches 369 on the exterior of the locking collar 366 for turning the nut 364, to effect the desired adjustment. After the bearing has been adjusted, the locking collar 366 is again moved inward to engage the serrations of the keyed collar 365 in manner to securely lock the nut 364 in adjusted position.

Figure 7:
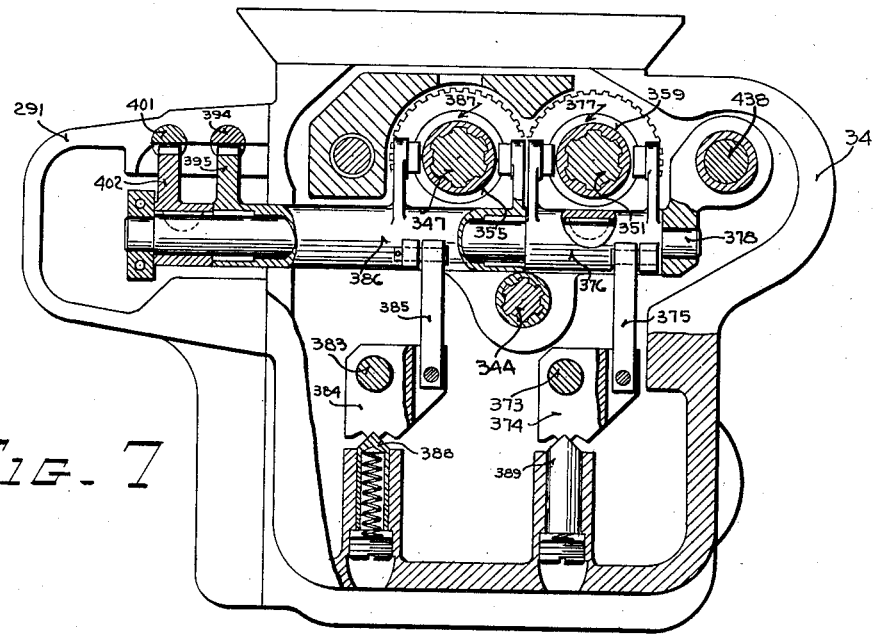
Fig. 7 is a view similar to Fig. 6 but taken in vertical section approximately along the line 7—7 of Fig. 1 with parts broken away.

For moving the clutch spools 355 and 359 to effect power movement of the knee 34 and the saddle 36, there is provided at the front of the knee a pair of manually operable shifting levers 371 and 372 that are pivotally mounted on the control bracket 345 as shown in Fig. 6. The lever 372 is fastened to a shaft 373 which extends into the bracket 345 and has connected to its inner end a crank 374, Fig. 7. The crank 374 is pivotally connected to the lower end of a link 375 which is pivotally connected at its upper end to a forwardly extending lug of a bell crank shifting yoke 376 having upwardly extending arms that engage a peripheral groove 377 in the clutch collar 359, the linkage operating in such manner that when the lever 372 in moved to the right the clutch collar 359 is moved forward on the shaft 351 and when the lever is moved to the left the clutch collar is moved rearwardly. As shown in Fig. 7, the shifting yoke 376 is keyed to a rocking shaft 378 that is journaled in the control bracket 345 beneath and transversely to the shafts 347 and 351.

The shifting lever 371 is in similar manner fastened to a shaft 383 having a crank element 384 on its inner end that is pivotally connected by a link 385 to a bell crank shifting yoke 386 provided with upwardly extending arms which engage a groove 387 in the clutch collar 355. By moving the shifting lever 371 to the right the clutch collar 355 is moved forward to engage the gear 353 and lock it to the shaft 347 to turn it in predetermined direction. To rotate the shaft 347 in the opposite direction, the lever 371 is moved to the left thereby moving the clutch collar 355 rearwardly into engagement with the gear 346. As shown in Fig. 7 the shifting fork 386 is rotatably mounted on the rocking shaft 378 in manner to be operable independently of the shifting fork 376.

To retain the shifting levers 371 and 372 in position there are provided spring spressed plungers 388 and 389 disposed to engage any one of three detents in the cranks 384 and 374 respectively, whereby each lever may be retained in either its right or its left engaged position or in its central neutral position.

To provide for actuating the clutches 355 and 359 in response to movement of the knee or the table, respectively, to predetermined positions, mechanical trip mechanisms are operatively connected with the shifting forks 386 and 376. As shown in Fig. 1, adjustably positioned trip dogs 391 and 392 are provided on the left side of the column in position to be engaged by a trip arm 393 pivotally mounted on the knee 34. The trip arm 393 is provided with an upstanding portion disposed to pivotally engage a horizontally mounted trip rod 394 that is slidably mounted in the knee and that is pivotally engaged near its forward end with an upstanding arm 395 formed integrally with the shifting yoke 386 as shown in Fig. 7, the arrangement being such that when the pivoted arm 393 is brought into engagement with either the dog 391 or the dog 392 in the course of vertical movement of the knee, the shifting fork 386 will be turned in proper direction to move the clutch 375 to neutral position thereby disengaging the knee elevating mechanism from the power driving means.

Likewise there is provided on the saddle 36 a pair of stop dogs 397 and 398, Fig. 1, that are disposed to engage a trip member 399 mounted on a trip rod 401 that is slidably mounted in the knee parallel with the trip rod 394. The trip rod 401 is pivotally engaged at its forward end with an upstanding arm 402, Fig. 7, keyed to the left end of the shaft 378 in such manner that when the trip member 399 is engaged by either the dog 397 or the dog 398 in the course of movement of the saddle 36, the rocking shaft 378 and the shifting fork 376 keyed thereto will be moved in direction to move the clutch 359 to neutral position thereby disengaging the cross traversing mechanism.

In order that the knee and the saddle may be moved manually, there are provided on the front of the knee, hand cranks 405 and 406 which may be operatively connected to turn the shafts 347 and 351, respectively. As shown in Fig. 5, the hand crank or hand wheel 406 for manually moving the saddle 36 is carried on the outer end of a shaft extension 407 fitted in the end of the cross traversing shaft 351 and pinned thereto. The hand wheel 406 is provided at its inner side with a cylindrical hub 408 presenting clutch teeth 409 that are disposed to be engaged with complementary clutch teeth 410 on the end of the shaft 351 when the hand wheel 406 is moved inwardly along the shaft 407 from its disengaged position shown in Fig. 5. A spring pressed detent ball 411 is provided in the hand wheel 406 for locking it on the shaft 407 in either the engaged or the disengaged position.

The hand crank 405 for manually moving the knee 34 is mounted on a shaft extension 414 that is fitted in the end of and pinned to a shaft 415 journaled in the control bracket 345 parallel with the elevating shaft 347 and operatively connected thereto by means of a gear 416 fixed to the inner end of the shaft 415 and meshing with a gear 417 fixed on the elevating shaft 347 inwardly from the reversing mechanism. The hand crank 405 is provided with an inwardly extending cylindrical hub 418 having at its inner end clutch teeth 419 for engaging complementary clutch teeth 420 on the outer end of the shaft 415 as shown. A detent mechanism 421 functions to retain the hand crank 405 either in its inner clutch engaging position as shown, or in an outer disengaged position.

When the hand cranks 405 and 406 are in their outer disengaged positions they are free to turn on the shaft extensions 407 and 414 respectively, or to remain stationary while the shafts turn within them during power movement of the knee and saddle. In order to obviate danger to the machine operator, the hand cranks 405 and 406 are prevented from being accidentally clutched with their associated shafts while the shafts are being rotated by power. For this purpose, each of the gear shifting levers 371 and 372 is provided with safety interlocking interfering means which positively prevent movement of either hand crank while the corresponding shifting lever is in position to engage the power driving connection.

As shown in Fig. 6, each of the levers 371 and 372 extends upwardly along a line intersecting the axis of its corresponding manually operated crank and each is provided with an interference ring or slotted guard portion 425 disposed to receive and fit over the corresponding shaft extension for the hand crank. The right and left end portions of the slot in the guard 425, as may be seen in Fig. 6, are of only sufficient width to receive the shaft extension when the lever is moved to one or the other clutch engaging position, whereby when a power clutch is engaged the corresponding hand crank clutch is obstructed and positively prevented from being moved rearwardly to engaged position. To permit engagement of the hand crank clutches when the power clutches are disengaged, each of the levers is provided in the middle of the slotted portion 425 with an enlarged opening 426 of sufficient diameter to receive the cylindrical hub of the corresponding hand crank in the manner shown with regard to the hub 418 of the hand crank 405 in Fig. 5. When the clutch of a hand crank is engaged in this manner, the corresponding power operating lever is positively prevented from being moved to power engaging position in either direction inasmuch as the end slots in the guard 425 are too narrow to pass over the cylindrical hubs of the hand cranks.

To change from manual operation to power operation, it is necessary to first move the hand crank outwardly thereby disengaging the hand crank clutch and moving the cylindrical hub out of interfering relation with the interference ring of the power control lever. The lever may then be moved to either the right or the left by reason of the narrow ends of the slot in guard 425 passing over the shaft extension, to permit engagement of the power clutch. As a further precaution, each interference ring is provided at each end with a latch or lug 427 one of which is moved into engagement with the clutch teeth of the hand crank whenever the corresponding shifting lever is moved to power operating position, whereby the hand crank is positively locked against rotation by the power driven shaft, which might otherwise cause the hand crank to spin rapidly should the crank happen to stick to the shaft by reason of rust or other foreign matter therebetween.

To provide for selectively moving the work supporting table 37 at rapid traverse rate, the rapid traverse shaft 232 in the bracket 233 is provided at its forward end with a rapid traverse friction clutch 430 as shown in Fig. 2 that may be engaged by moving upward a rapid traverse lever 431 pivotally mounted at the right side of the knee, to couple the shaft 232 with a gear wheel 432 that is rotatably mounted in the bracket 233 in front of the clutch 430. As shown in Fig. 8, the rapid traverse gear wheel 432 meshes with a gear wheel 433 fixed on the rear of a shaft 434 journaled within the knee 34. At its forward end, the shaft 434 is provided with a gear 435 that meshes with the gear 343 on the shaft 344 in the control bracket 345 as shown in Fig. 9. When the friction clutch 430 is engaged by lifting the lever 431, the shaft 434 is turned at rapid traverse rate and the gear 435 thereon turns the large gear 343 thereby operating the gear 346 and the associated reversing mechanisms at rapid traverse rate, the gear 342 on the shaft 288 being also rotated at rapid traverse rate turns the shaft 288 within the overrunning clutch 287 independently of the rate changing mechanism 260. The connection of the lever 431 to the friction clutch 430 is such that when the lever is released it moves downwardly by gravity to disengage the clutch.

For delivering power to the saddle 36 for moving the work table 37 longitudinally at any selected feed rate or at rapid traverse rate, there is provided a splined shaft 438 which is disposed at the right side of the knee above the bracket 233 with its ends journaled respectively in the rear portion and the forward portion of the knee 34, as shown in Fig. 5. At the forward end of the shaft 438 there is provided a gear wheel 439 that meshes with the broad faced gear wheel 350 journaled on the shaft 351, in such manner that the shaft 438 will be driven by means of the intermeshing gear wheels 350 and 349, from either the feed driving shaft 288 or the rapid traverse driving shaft 434 selectively. The splined shaft 438 passes through the bracket 361 depending from the saddle 36, Fig. 10, and has splined connection with a bevel pinion 440 rotatably mounted in the bracket. To protect the splined shaft 438, there are provided at each side of the bracket 361 collapsible guards 441 comprising telescoping tube sections arranged to entirely enclose the shaft 438 at any position of the bracket 361 therealong.

As shown in Fig. 10, the bevel pinion 440 carried by the bracket 361 meshes with a similar bevel pinion 442 disposed with its axis vertical and having a tongue and groove connection 443 at its upper end with a bevel pinion 444 that meshes with two bevel pinions 445 and 446 rotatably mounted on a horizontally disposed sleeve 447 in the saddle 36. The sleeve 447 has slidably keyed thereon a clutch spool 448 presenting at each end clutch teeth disposed to operatively engage complementary clutch teeth on the pinions 445 and 446 respectively to selectively connect either pinion to the sleeve whereby the sleeve may be caused to rotate in either direction by power transmitted from the shaft 438. The sleeve 447 is slidably keyed to a screw shaft 450 that is journaled at its ends in bearings depending from the ends of the table 37 and that has threaded engagement with a nut 451 fixed in the saddle 36, whereby rotation of the screw 450 by the sleeve 447 causes the table 37 to move longitudinally relative to the knee 36. A gear wheel 452, Fig. 11, driven from the pinion 446 provides means for driving auxiliary apparatus that may be mounted on the table.

Figure 11:
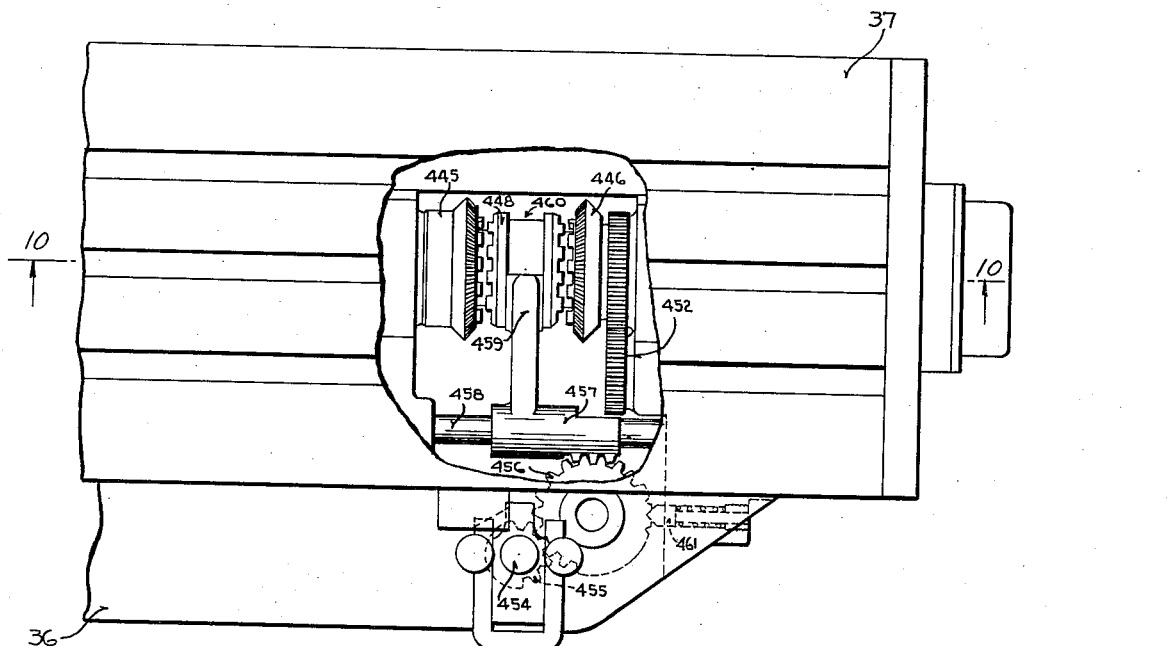
Fig. 11 is a view in plan, with parts broken away, of the portion of the table shown in Fig. 10.

For effecting independent selective reversal of the direction of power movement of the table 37, there is provided in the front portion of the saddle 36 a table controlling lever 453 arranged to operate a short vertical shaft 454 as shown in Fig. 11, that has on its lower end within the saddle a pinion 455 meshing with a gear 456 that in turn meshes with rack teeth on a shifting fork 457 slidably mounted on a bar 458. The shifting fork 457 is provided with a shoe 459 operating in a peripheral groove 460 of the reversing clutch spool 448. When the lever 453 is in the central position shown in Fig. 11, the clutch spool 448 is disposed in neutral position out of engagement with the pinions 445 and 446 whereupon the pinions may rotate on the sleeve 447 without turning the feed screw 450. When the lever 453 is moved to the left or to the right the clutch 448 is engaged to effect feeding of the table to the left or to the right respectively, there being a detent mechanism 461 associated with the gear wheel 456 for retaining the lever in any one of its three positions. For moving the table manually, there is provided an automatically disengaging hand crank 462 shown in Fig. 1 at the left end of the table.

For transmitting power to move the sliding head 32 relative to the column 31 at a selected feeding rate or at rapid traverse rate, the table driving shaft 438 is provided at the rear end thereof as shown in Fig. 5 with a spur pinion 463 meshing with a pinion 464 journaled in the knee and which has formed integrally therewith a bevel pinion 465 meshing with a bevel pinion 466 on the lower end of a telescoping shaft 467 that extends from the knee 34 upwardly to the head operating mechanism in the bracket 100 at the right side of the column 31 as shown in Fig. 2, the telescoping shaft 467 being extensible to provide for vertical movement of the knee. At its upper end, the shaft 467 is provided with a bevel pinion 468 that meshes with two bevel pinions 469 and 470, respectively, rotatably mounted on a horizontal shaft 471 journaled in the bracket 100. Between the bevel pinions 469 and 470 there is provided a clutch spool 472 which is splined to the shaft 471 and is operative to connect either of the pinions 469 and 470 to the shaft 471 for turning it in either direction. At its forward end the shaft 471 is provided with a bevel pinion 474 that meshes with a bevel pinion 475 fixed on the shaft 103 that is journaled in the bracket 100 at right angles to the shaft 471 and that is operatively connected as shown in Fig. 21 and as previously described, to turn the threaded sleeve 110 for moving the sliding head 32 vertically along the forward face of the upper end of the column. Interlocking means are provided to prevent rotation of the hand wheel 98 by the power operated mechanism.

A shifting lever 477 is pivotally mounted on the bracket 100 near the front thereof and is operatively connected to a shifting rod 478 on the end of which is a shifting fork 479, engaging the clutch spool 472 in manner to move it into clutching engagement with either of the pinions 469 and 470 to effect movement of the head 32 selectively in either direction. For controlling the movement of the sliding head 32 automatically there are provided on the right side thereof a pair of adjustable trip dogs 481 and 482, the dog 481 being disposed to engage the forward end of the shifting rod 478 in manner to move the clutch spool 472 to neutral position from its forward engaged position, and the dog 482 being disposed to engage a trip rod 483 that is operatively connected to the shifting rod 478 in manner to move the clutch spool 472 to neutral position from its rearward engaged position.

From the foregoing explanation of the construction and operation of a preferred embodiment of the invention, it is apparent that the invention has provided an improved milling machine of simple and rugged construction that is versatile and convenient to operate and that embodies safety features of advanced design.

Although only one embodiment of the invention has been shown and described, it will be apparent to those skilled in the art to which this invention relates that various modifications in the manner of constructing the machine may be effected without departing from the spirit and scope of the invention as defined in the subjoined claims.

The invention is hereby claimed as follows:

1. In a milling machine, the combination with a column, a tool spindle rotatably carried by said column, a driving element mounted in said column, and selective means for operatively connecting said driving element to said tool spindle; of a plurality of superimposed relatively movable work supporting members movably mounted on said column, transmission means for moving each of said members independently including independent reversing and disconnecting means for each member, a rapid traverse clutch carried by one of said movable elements and connected to selectively drive said transmission means at rapid traverse rate, constant speed power transmitting means operatively connecting said rapid traverse clutch directly to said driving element, an overrunning clutch connected to drive said member moving transmission means, a feed rate changer carried by one of said movable members and connected to drive said transmission means through said overrunning clutch, and constant speed power transmitting means operatively connecting said feed rate changer with the means for selectively connecting said driving element to said tool spindle in such manner that said feed rate changer will operate only when said spindle is being driven.

2. In a milling machine, the combination with a column and power driving means associated with said column, of a spindle rotatably carried by said column, a spindle driving power transmission train operatively connected to drive said spindle, a clutch operatively disposed to connect said spindle driving train to said power means, a feed shaft operatively connected to said spindle train in manner to be driven at constant speed thereby when said spindle clutch is engaged, a rapid traverse shaft operatively connected to said power source in manner to be driven directly thereby at constant speed, a plurality of superimposed work supporting members including a knee slidably mounted on said column for vertical movement relative thereto a saddle slidably carried by said knee for horizontal movement and a work table slidably carried by said saddle for horizontal movement at right angles to the direction of movement of said saddle, a feed rate changer carried by said knee, means operatively connecting said constant speed feed shaft to said feed rate changer, a feed transmission train connected to be driven by said rate changer and having branches operatively connected to actuate said knee said saddle and said table, an independent reversing mechanism in each of said branches selectively operable to effect movement of its associated member in either direction or to disconnect said member from said feed train, an overrunning clutch disposed to operatively connect said feed train to said rate changer, and a clutch mounted in said knee and disposed to selectively operatively connect said rapid traverse drive shaft to said feed transmission train to operate it at rapid traverse rate, said overrunning clutch permitting driving of said feed train faster than said rate changer.

3. In a milling machine, the combination with a machine column structure provided with a vertical slot in its forward face and a knee slidably mounted thereon for vertical movement adjacent to said slot, of driving mechanism within said column including two vertically extending shafts disposed adjacent to said slot, operating mechanism for said knee including two horizontally disposed shafts carried by said knee in position to extend through said vertical slot and operatively connected to said vertical driving shafts in manner permitting relative vertical movement therebetween, and collapsible means including a plurality of sliding plates arranged to close said vertical slot above and below said vertically movable horizontal shafts.

4. In a milling machine, the combination with a column provided with a knee slidably mounted for vertical movement thereon, of operating mechanism for said knee including two horizontally disposed shafts carried by and extending along one side of said knee and projecting past one side of said column, a guide member extending vertically in spaced relation with said column outwardly of said horizontal shafts and defining a vertical slot for movement of said shafts with vertical movement of said knee, means carried by said column operatively connected to drive said vertically movable horizontal shafts, and collapsible sliding plate closure means disposed within said slot above and below said horizontal shafts in manner to close said slot while permitting vertical movement of said shafts.

5. In a milling machine, the combination with a column provided with a motor compartment in the lower part thereof and having an opening in one side leading into said compartment, of a power driven shaft extending vertically within said compartment near the open side of said column, a knee structure slidably mounted on said column, an actuating shaft carried by said knee at the side thereof in horizontal position to extend rearwardly past the open side of said column into juxtaposition with said vertical shaft, means operatively connecting said horizontal shaft to be driven by said vertical shaft in manner to permit vertical movement of said horizontal shaft with said knee, a vertically disposed guard member having a longitudinal passageway therethrough positioned outwardly from said horizontal shaft on said column in spaced relation to and defining with said column a vertical slot for accommodating the vertical movement of said horizontal shaft, a plurality of sliding plates arranged in telescoping relation in said slot between said guard member and said column in manner to form collapsible closures in said slot above and below said horizontal shaft, a door hingedly mounted on said column and disposed to close the remaining opening in the side thereof defined at one edge by said vertical guard member, a fluid pump mounted in the base of said column, and tubular means connecting said pump to the lower end of said passageway in said guard member for delivering fluid vertically through said guard member.

6. In a machine tool, the combination with a power driven member for actuating a movable part of the machine, of manually operable means connectable for actuating said movable part, and control means for operatively connecting said power driven means to said movable part to actuate it by power, said control means including an interlocking device disposed to prevent engagement of said power driven member for power operation of said movable part when said manually operable means is connected to actuate said part, and a locking element actuated by said interlocking device and effective to positively prevent movement of said manually operable means whenever said power driven means is connected to actuate said part.

7. In a machine tool, the combination with a frame and a part movable relative to said frame, of mechanism for effecting movement of said part, manually operable means disposed to be manually engaged with said part moving mechanism for manual operation thereof, power operable means disposed to be manually engaged with said part moving mechanism for power operation thereof, an interlocking device operative to permit manual engagement of said power operable means only when said manually operable means is disengaged from said part moving mechanism, and a latch actuated by said interlocking device and disposed to lock said manually operable means to prevent movement thereof while said power operable means is engaged with said part moving mechanism.

8. In a machine tool having relatively movable parts, a rotatable shaft operatively connected to effect relative movement of said parts, power actuated means disposed to be connected to said shaft for power operation of said movable parts, a pivotally mounted lever operative to selectively connect said power means to said shaft, a hand wheel mounted on said shaft and connectable therewith for manual movement of said machine tool parts, and a latch associated with said lever and operative to positively lock said hand wheel in stationary position whenever said power means is connected to said shaft.

9. In a machine tool having relatively movable parts, a rotatable shaft connected to effect relative movement of said parts, a manually rotatable member operatively associated with said shaft, clutch means mounted for axial movement along said shaft to selectively connect said manually rotatable member with said shaft for manual movement thereby of said machine parts, power operable means operatively associated with said shaft, a pivoted lever connected to engage or disengage said power operable means upon movement to different positions respectively, interfering means carried by said lever in position to be moved into the path of said clutch means when said lever is moved to power engaging position for power movement of said machine parts to thereby prevent engagement of said manual member with said shaft while said power means is engaged, said interfering means being so positioned that when said manual member clutch is engaged said clutch is moved into the path of said interfering means to thereby prevent engagement of said power means while said manual member is engaged, and locking means on said lever disposed to engage said manually rotatable member when said power operable means is connected with said shaft to positively prevent rotation of said manually rotatable member by said power driven shaft to obviate danger to the machine operator.

10. In a machine tool having a rotatable spindle and means for driving said spindle, the combination with a speed changing transmission mechanism operatively connecting said driving means to said spindle and including a primary rate changer having four positions for effecting four speed ranges, a secondary rate changer having two positions for effecting two speed rates, and a tertiary rate changer also having two positions for effecting two speed rates, said rate changers being arranged in series relation in said transmission mechanism in manner to cooperate in effecting speed changes; of a rotatably mounted primary shifting lever connected to operate said primary rate changer, said lever being movable to four equally spaced positions corresponding to the four ranges effected by said primary rate changer, an annular chart fixed with said primary shifting lever concentric therewith and presenting indicia arranged in two concentric rows thereon in sectors corresponding with the total number of speed rates of said transmission, a secondary shifting lever connected to operate said secondary rate changer, an indicator disposed in cooperating relation with said indicia chart and operative over a quadrant thereof in response to movement of said secondary shifting lever, a tertiary shifting lever connected to operate said tertiary rate changer, and means associated with said tertiary shifting lever to identify the row of said indicia to be read in conjunction with said indicator to ascertain from said chart the speed rate resulting from the combined effects of said primary said secondary and said tertiary rate changers.

11. Indicator mechanism for a machine tool speed changing transmission, comprising a rotatably mounted crank arm operative to effect adjustment of said transmission for operation in any one of a plurality of speed ranges and disposed to be positioned angularly in any one of a plurality of equally spaced positions representing said speed ranges, a circular chart mounted to rotate with said crank and presenting indicia arranged in two concentric rows representing the various speed changes which may be effected by said transmission angularly divided into ranges corresponding to the various positions of said crank, a lever operatively connected to effect adjustment of said transmission for operation at any one of a plurality of speeds within the speed range to which said transmission is adjusted by said crank, a speed indicator disposed for angular movement in cooperating relation with said circular chart throughout the range thereof corresponding to the speed range to which said transmission is adjusted and responsive to movement of said lever to indicate on said chart the angular division resulting from the adjustment of both said crank and said lever, another lever disposed on a relatively movable part of the machine tool and operative to effect adjustment of a part of said speed changing transmission carried by the relatively movable part of the machine, said lever being movable to two positions, and indicating means associated with said two positions of said lever for identifying the row of indicia on said circular chart to be read in conjunction with said speed indicator to ascertain the speed rate resulting from the adjustment of said transmission by all of said adjusting means.

12. In a milling machine of the vertical type having a column, a sliding head carried by said column, and a vertically disposed tool spindle rotatably supported in said sliding head, the combination with driving mechanism mounted in said column, of a speed changing mechanism in said column operatively connected to said driving mechanism, a speed changing lever rotatably mounted on said column for movement to any one of a plurality of equally spaced positions and operatively connected to adjust said speed changing mechanism in manner to effect corresponding speed changes, a circular dial cooperatively associated with said speed changing lever and presenting indicia arranged in two concentric rows and corresponding in angular position with the positions that may be assumed by said lever, indicating means disposed to cooperate with said dial to indicate thereon the angular position of said lever, a supplemental speed changing mechanism mounted in said sliding head and operatively connecting said column-mounted speed changing mechanism to said spindle, a supplemental speed changing lever carried bodily on said sliding head and arranged to be moved to either one of two positions to actuate said supplemental speed changing mechanism in manner to change the operating speed of said spindle to either one of two ranges, and means associated with said supplemental speed changing lever to identify the row of indicia on said dial to be read in conjunction with said indicator to ascertain the speed resulting from the combined effects of said speed changers.

13. A milling machine comprising a column, gearing housed within said column, means in said column arranged to supply lubricant to said gearing, and a baffled louver disposed in one side of said column said baffled louver having baffle plates arranged in manner to permit air to circulate therethrough into or out of said column to ventilate it and so disposed as to prevent the escape of lubricant therethrough out of said column.

14. In a milling machine, the combination with a machine column provided with a driving motor in the base thereof, of transmission mechanism including a clutch operatively associated with said driving motor, a clutch actuating lever mounted on said column near the top thereof, a hollow clutch control shaft operatively connecting said clutch lever to said clutch for engaging or disengaging said clutch, a motor-control switch mounted on said column near the top thereof, and control conductors extending from said switch longitudinally through said hollow clutch control shaft to said motor for electrically connecting said switch to said motor.

15. In a milling machine provided with a column, the combination with speed changing gearing enclosed in said column within a closed compartment providing a lubricating chamber and a driving motor disposed within a separate compartment beneath said gear compartment, of a driving connection between said motor and said gearing including a clutch, a clutch actuating lever mounted on said column above said speed changing gearing, a hollow clutch control shaft extending vertically within said lubricating chamber and operatively connecting said clutch lever with said clutch for engaging or disengaging said clutch, a motor-control switch mounted above said speed changing gearing, electrical control conductors extending from said switch downward through said hollow clutch control shaft to said motor for operatively connecting said switch to said motor, and a tube extending from said gear compartment into said motor compartment and having telescoping rotatable connection with said hollow shaft constituting a conduit for conveying said conductors from the lower end of said shaft to said motor.

16. In a milling machine having a frame, the combination with a power driven element mounted in said frame, a tool spindle rotatably mounted in said frame, and transmission means including a clutch selectively connecting said tool spindle to said power driven element for operation thereby, of a work supporting structure including superimposed members mounted on said frame in manner to support a workpiece for movement relative to said tool spindle along three angularly disposed paths, three work-moving trains each including a reversing and a disconnecting mechanism and arranged respectively to move said work supporting members along each of said three paths independently, a common driving element carried by said work supporting structure and connected to drive said three work moving trains, constant speed transmission means including a clutch carried by said work supporting structure and disposed to selectively connect said common driving element directly to said power driven element in said frame for actuating said work moving trains at rapid traverse rate independently of said tool spindle transmission means, and another transmission means including a feed rate changing mechanism carried by said work supporting structure and a constant speed drive train disposed to connect said rate changing mechanism to said spindle transmission means in said frame, said rate changing mechanism being connected to said common driving element in such manner that when said spindle clutch is engaged said common driving element is driven to actuate said work-moving trains at a selected feed rate.

17. In a machine tool, the combination with relatively movable parts and means for effecting relative movement of said parts, of manually operable means disposed to be connected for manual actuation of said part-moving means disposed to be connected, power operable means for power actuation of said part moving means, control means disposed to connect said power operable means to said part-moving means when said manually operable means is disconnected therefrom, interlocking means operative to prevent connection of said power operable means to said part-moving means when said manually operable means is connected thereto, and positive locking means actuated by said interlocking means and operative to prevent movement of said manually operable means whenever said power operable means is connected to said part-moving means, whereby danger of injury to the machine operator by reason of power movement of the normally manually operable means is obviated.

18. In a machine tool, the combination with a rate changing mechanism having shiftable members arranged for movement to effect a plurality of rates of speed, of mechanism for shifting said members including a rotatably mounted lever movable to four equally spaced positions and operatively connected with said shiftable members to effect four adjustments thereof, a circular chart mounted to turn with said lever and presenting speed indicia arranged in inner and outer circular rows divided angularly into eight divisions each division including an indicium in each of said rows, a second lever pivotally mounted coaxially with said first lever and provided with a window arranged to enclose one of said divisions of said chart, said lever being arranged to move angularly to two positions to bring said window into register with one or another of adjacent divisions of said chart and to shift members of said rate changer to effect two speed combinations, and a third lever shiftable to two position to adjust said rate changer in manner to effect two ranges of operation thereof and having indicating means for identifying the inner or the outer row of indicia to be read within said window in accordance with the position of said third lever to determine the speed rate resulting from shifting of said three levers.

19. In an indicator mechanism for a machine tool speed changing transmission, a rotatably mounted crank arm operatively connected to effect adjustment of said transmission for operation in any one of a plurality of speed ranges upon said crank arm being positioned angularly at any one of a plurality of equally spaced positions, a circular speed chart secured to said crank concentric therewith and presenting indicia representing the speed changes obtainable by means of said transmission, said indicia being arranged in two concentric rows circumferentially thereof, a second crank arm rotatably mounted concentric with said first crank arm and operatively connected to effect adjustment of said transmission for operation at one of a plurality of speeds included within the speed range to which said transmission is adjusted by said first crank, a speed indicator operatively associated with said second crank and disposed for angular movement concentric with and in cooperating relation with said circular chart throughout the segment thereof representing the speed range to which said transmission is adjusted, a third crank arm operatively connected to effect adjustment of said transmission for operation in either one of two major ranges, and indicating means associated with said third crank arm to indicate the row on said chart that is to be read in cooperation with said speed indicator of said second crank arm to ascertain the speed to which said transmission is adjusted as the combined result of positioning said first, second and third crank arms.

20. In a milling machine having a column, a power driven element associated with said column, a tool spindle rotatably mounted in said column, and a spindle driving transmission mechanism including a disconnecting clutch operative to selectively connect said power driven element to said tool spindle to drive it; the combination with a work supporting structure including a knee slidably mounted for vertical movement on said column, a saddle slidably carried by said knee, and a work table slidably carried by said saddle; of work support moving mechanism including a table driving train having an independent reversing and disconnecting mechanism, a saddle driving train having an independent reversing and disconnecting mechanism, a knee driving train having an independent reversing and disconnecting mechanism, and a common driving member mounted in said knee and operatively connected to actuate all of said support driving trains; and support driving mechanism including a feed rate changer mounted in said knee, a constant speed driving train operatively connecting said feed rate changer in said knee to said spindle driving transmission mechanism in said column in manner to be driven thereby whenever said spindle clutch is engaged to drive said spindle, an over-running feed clutch disposed to operatively connect said feed rate changer to said common support driving member for driving said support moving mechanism at selected feed rate, a rapid traverse clutch mounted in said knee and operative to selectively actuate said common support driving member for driving said support moving mechanism at rapid traverse rate with said feed clutch over-running, and a constant speed driving train operatively connecting said rapid traverse clutch in said knee directly to said power driven element in said column in manner to be driven thereby whenever said power driven element is operating and regardless of whether or not said spindle is being driven.

21. In a milling machine, the combination with a column, a tool spindle rotatably supported by said column, and a power driven element carried by said column; of a power train operatively connected to drive said tool spindle, a clutch arranged to selectively connect said power train to said power driven element, a knee slidably mounted on said column for vertical movement relative thereto, a saddle slidably mounted on said knee, a table slidably mounted on said saddle, independent driving trains for said knee, said saddle, and said table, said driving trains each including an independent reversing and disconnecting mechanism, a work moving member rotatably supported in said knee in manner to be moved bodily therewith and connected to actuate all of said independent driving trains, a feed rate changer mounted in said knee and operatively connected to selectively actuate said rotatable work moving member at feed rate, a feed transmission mechanism operatively connected to be driven by said power train when said clutch is engaged at a rate having a constant relation to the rate of said power driving element, said transmission being connected to drive said feed rate changer, and a second transmission mechanism operatively connected to be driven directly by said power driving element and arranged to be selectively connected to said rotatable work moving member to actuate it at a rate having a constant relation to the rate of said power driving element.

22. In a milling machine, the combination with a column having a vertically extending opening in one side, of a closure structure for said opening including a hingedly mounted door, a vertically disposed door jamb member mounted adjacent to said opening in position to cooperate with one edge of said door, said door jamb member being formed hollow to provide a passageway for conducting coolant fluid upward from the base of said column, and a coolant pump mounted in said column and connected to force coolant fluid into the lower end of said hollow door jamb member.

23. In a disconnecting and reversing mechanism for controlling the movements of a plurality of machine tool elements, a driving shaft arranged to be rotated at a selected rate, two element-moving shafts disposed parallel with and equally spaced from said driving shaft, two driving gears fixed on said driving shaft in spaced relation, a wide faced gear rotatably mounted on one of said element-moving shafts and meshing with one of said driving gears, a second wide faced gear rotatably mounted on the other of said element-moving shafts and meshing with the other of said driving gears, a reverse gear rotatably mounted on each of said element-moving shafts and meshing with the wide faced gear on the other element-moving shaft but offset axially from the driving gear meshed therewith, the arrangement being such that the reverse gears rotate opposite to the wide faced gears, and a clutch mechanism on each element-moving shaft operative to connect either the wide faced gear or the reverse gear thereto for driving the shaft selectively in either direction.

24. In a milling machine, the combination with a column and a power transmission mechanism mounted in said column, of a knee slidably mounted on said column, a saddle and a table slidably supported by said knee, independent driving trains for said knee said saddle and said table, said driving trains each including independent reversing and disconnecting mechanism, a common driving member for said driving trains carried by said knee in manner to move bodily therewith, a feed rate changer carried by said knee and connectable to actuate said common driving member at a selected feed rate, a constant speed feed transmission mechanism operatively connected to be driven in predetermined manner by said transmission mechanism in said column and connected to drive said feed rate changer, and a constant speed rapid traverse transmission mechanism operatively connected to be driven in another predetermined manner by said transmission mechanism in said column and selectively connectable directly to said common driving member to actuate it at rapid traverse rate.

25. In a milling machine, the combination with a column provided with a knee movably mounted thereon and a saddle and table slidably supported by said knee, of a feed rate transmission mechanism carried by said knee, a selectively driven shaft for supplying power from said column to said transmission mechanism, a common driver selectively operable by said transmission mechanism at a selected feed rate, a continuously driven shaft connectable to supply power from said column directly to said common driver, means for shifting said knee said saddle and said table respectively, and means for selectively coupling any of said shifting means to said common driver for actuation thereby at a predetermined rate.

26. In a milling machine having a column, the combination with a power driven element mounted in said column, of a work supporting structure including superimposed members mounted on said column in manner to support a workpiece for movement relative to said column along three angularly disposed paths, an independent work moving train for moving said work supporting structure along each of said paths said trains being selectively operative to effect movement in either direction, a common driving element carried by said work supporting structure and connected to drive said work moving trains, a continuously operating transmission means disposed to transmit power directly from said power driven element in said column to said work supporting structure and selectively connectable to actuate said common driving element, a rate changing mechanism carried by said work supporting structure and selectively connectable to drive said common driving element, and an intermittently operating transmission means disposed to transmit power from said power driven element in said column to said rate changing mechanism to actuate said common driving element at a selected rate.

27. In a milling machine having a column, the combination with a power driven element mounted in said column, of a work supporting structure including superimposed members mounted on said column in manner to support a workpiece for movement relative to said column along three angularly disposed paths, an independent work moving train for moving said work supporting structure along each of said paths said trains being selectively operable to effect movement in either direction, a common driving element carried by said work supporting structure and connected to drive said work moving trains, a continuously operating rapid traverse transmission means disposed to transmit power directly from said power driven element in said column to said work supporting structure and selectively connectable to actuate said common driving element at rapid traverse rate, a feed rate changing mechanism carried by said work supporting structure and selectively connectable to drive said common driving element at a selected feed rate, and an intermittently operating transmission means disposed to transmit power from said power driven element in said column to said feed rate changing mechanism.

28. In a milling machine having a column, the combination with a power driven element mounted in said column, of a work supporting structure including superimposed members mounted on said column in manner to support a workpiece for movement relative to said column along three angularly disposed paths, an independent work moving train for moving said work supporting structure along each of said paths said trains being selectively operable to effect movement in either direction, a common driving element carried by said work supporting structure and connected to drive said work moving trains, a continuously operating rapid traverse transmission means disposed to transmit power directly from said power driven element in said column to said work supporting structure and selectively connectable to actuate said common driving element at rapid traverse rate, a feed rate changing mechanism carried by said work supporting structure and selectively connectable to drive said common driving element at a selected feed rate, an intermittently operating transmission means disposed to transmit power from said power driven element in said column to said feed rate changing mechanism, and a single control lever disposed to adjust said rate changing mechanism for selecting the feed rate.

29. In a milling machine having a column, the combination with a power driven element mounted in said column, of a work supporting structure including superimposed members mounted on said column in manner to support a workpiece for movement relative to said column along three angularly disposed paths, an independent work moving train for moving said work supporting structure along each of said paths said trains being selectively operable to effect movement in either direction, a common driving element carried by said work supporting structure and connected to drive said work moving trains, a continuously operating rapid traverse transmission means disposed to transmit power directly from said power driven element in said column to said work supporting structure and selectively connectable to actuate said common driving element at rapid traverse rate, a feed rate changing mechanism carried by said work supporting structure and selectively connectable to drive said common driving element at a selected feed rate, an intermittently operating transmission means disposed to transmit power from said power driven element in said column to said feed rate changing mechanism, and a feed dial associated with said feed rate changing mechanism and operative to indicate the feed rate for which said mechanism is adjusted.

30. In a milling machine, the combination with a machine column structure presenting a vertical slot in its forward face and a knee slidably mounted on said column for vertical movement parallel with said slot, of driving mechanism within said column including a vertically disposed shaft positioned adjacent to said slot, operating mechanism within said knee, driving means for said operating mechanism including a horizontally disposed shaft carried by said knee in position to extend through said vertical slot in said column, means operatively connecting said horizontal shaft to said vertical driving shaft within said column in manner permitting relative vertical movement therebetween, and collapsible sliding plate closure means arranged within said vertical slot above and below said vertically movable horizontal shaft.

31. In a machine tool, the combination with a stationary element, a relatively movable element, and a driven part carried bodily by said movable element, of a transmission mechanism including a range changing mechanism carried by said movable element and connected to drive said driven part, a speed changing mechanism mounted in said stationary element and connected to drive said range changing mechanism in said movable element, means on said stationary element for adjusting said speed changing mechanism, means on said relatively movable element for adjusting said range changing mechanism, speed indicating mechanism on said stationary element responsive to movement of said speed changing mechanism adjusting means and effective to delineate a plurality of speed rate indicia, and indicating means associated with said range changing mechanism adjusting means and effective to indicate the one of said delineated speed indicia which represents the speed of operation of said driven part.

32. In a machine tool, the combination with a rate changing mechanism, of a lever rotatably mounted for movement to four equally spaced positions and operatively connected to adjust said rate changing mechanism to effect different rates of speed corresponding to said four positions, a circular dial fixed with said lever and presenting a chart indicative of the speed rates obtainable by said rate changer said chart being divided angularly into divisions, a second lever pivotally mounted coaxially with said first lever for angular movement to two positions and operative to adjust said rate changer to operate in either one of two ranges, said second lever being provided with means to indicate the one or the other of two adjacent divisions of said circular chart to thereby indicate the rate at which said rate changer is adjusted by said two levers.

33. In a machine tool provided with a movable part, a power driven member selectively connectable to actuate said movable part, manually operable means selectively connectable alternatively to actuate said movable part, a control lever arranged to effect connection of said power driven member to said movable part, and a latch operated by said control lever in manner to engage said manually operable means to restrain it from movement while said power driven member is connected to actuate said movable part.

34. In a machine tool, the combination with a supporting member and a movable member carried thereby, of means for moving said movable member relative to said supporting member, a hand crank selectively engageable for connection to said member moving means, power driven means selectively engageable for connection to said member moving means, a lever operative to control the engagement of said power driven means, an interlocking arrangement between said hand crank and said lever arranged to prevent engagement of said hand crank while said power means is engaged and to prevent engagement of said power means while said hand crank is engaged, and a latch associated with said lever and operative to engage said hand crank in manner to prevent rotation thereof when said power means is engaged to drive said member moving means.

35. Actuating apparatus for a movable element of a machine tool, comprising power driven means operative to actuate said movable element, manually driven means operative alternatively to actuate said movable element, and control mechanism arranged to connect the one or the other of said actuating means to said movable element selectively for effecting either power operation or manual operation of said element said control mechanism including locking means effective whenever said power driven actuating means is connected to said movable element to lock said manually driven means in stationary position, whereby accidental movement of said manually driven means by power is positively prevented.

36. In a milling machine provided with a column, the combination with speed changing gearing enclosed in said column within a closed compartment providing a lubricating chamber, and a driving motor disposed within a separate compartment beneath said gear compartment, of a driving connection between said motor and said gearing including a clutch, a clutch actuating lever mounted on said column above said speed changing gearing, a hollow clutch control shaft extending vertically through said lubricating chamber and operatively connecting said clutch lever with said clutch for engaging or disengaging said clutch, a motor control switch carried by said column above said speed changing gearing, and an electrical control conductor extending from said switch downward through said hollow clutch control shaft to said motor for operatively connecting said switch to said motor.

37. In a milling machine provided with a column, the combination with speed changing gearing enclosed in said column within a closed compartment providing a lubricating chamber, and a driving motor disposed within a separate compartment beneath said gear compartment, of a driving connection between said motor and said gearing including a clutch, a clutch actuating lever mounted on said column above said speed changing gearing, a hollow clutch control shaft extending vertically within said lubricating chamber and operatively connecting said clutch lever with said clutch for engaging or disengaging said clutch, a motor control switch carried by said column above said speed changing gearing, an electrical control conductor extending from said switch downward through said hollow clutch control shaft to said motor for operatively connecting said switch to said motor, and conduit means arranged at each end of said hollow shaft for protecting said conductor from contact with lubricant in said chamber.

38. A machine tool comprising a supporting housing, gearing housed within said supporting housing, means in said housing arranged to supply lubricant to said gearing, and a baffled louver disposed in one side of said housing said baffled louver having baffle plates arranged in manner to permit air to circulate therethrough into or out of said housing to ventilate it and so disposed as to prevent the escape of lubricant therethrough out of said housing.

JOSEPH B. ARMITAGE.